US012561229B2

(12) United States Patent
Chen et al.

(10) Patent No.: US 12,561,229 B2
(45) Date of Patent: Feb. 24, 2026

(54) STACK FRAME GENERATION FOR SOURCE CODE ENCLOSED BY MACROS

(71) Applicant: International Business Machines Corporation, Armonk, NY (US)

(72) Inventors: Xiao Ling Chen, Beijing (CN); Qi Ye, Shanghai (CN); Heng Wang, Beijing (CN); Qi Li, Beijing (CN); Navya Ramanjulu, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 17/821,268

(22) Filed: Aug. 22, 2022

(65) Prior Publication Data

US 2024/0061764 A1 Feb. 22, 2024

(51) Int. Cl.
*G06F 11/362* (2025.01)
*G06F 16/22* (2019.01)
*G06F 16/2455* (2019.01)

(52) U.S. Cl.
CPC ........ *G06F 11/364* (2013.01); *G06F 16/2228* (2019.01); *G06F 16/24566* (2019.01)

(58) Field of Classification Search
CPC .............. G06F 11/364; G06F 16/2228; G06F 16/24566
USPC ........................................................ 717/128
See application file for complete search history.

(56) References Cited

U.S. PATENT DOCUMENTS

| | | | | | |
|---|---|---|---|---|---|
| 6,158,045 | A | * | 12/2000 | You ...................... | G06F 11/3698 |
| | | | | | 717/124 |
| 6,161,219 | A | * | 12/2000 | Ramkumar ......... | G06F 11/1438 |
| | | | | | 717/130 |
| 6,792,523 | B1 | * | 9/2004 | Glew .................. | G06F 9/30105 |
| | | | | | 712/217 |
| 9,134,966 | B2 | * | 9/2015 | Brock ........................ | G06F 8/44 |
| 10,152,488 | B2 | * | 12/2018 | Desineni ............. | G06F 3/04842 |
| 11,288,170 | B1 | | 3/2022 | Chen et al. | |
| 11,675,575 | B2 | * | 6/2023 | Huang .................... | G06F 8/423 |
| | | | | | 717/136 |

(Continued)

OTHER PUBLICATIONS

Culpepper, Ryan, and Matthias Felleisen. "Debugging macros." Proceedings of the 6th international conference on Generative programming and component engineering. 2007. pp. 135-144. (Year: 2007).*

(Continued)

*Primary Examiner* — Satish Rampuria
(74) *Attorney, Agent, or Firm* — Yee & Associates, P.C.

(57) ABSTRACT

A computer implemented method for debugging computer instructions is provided. The method comprises using a number processors to receive a computer program, including a source code and generate a number of information records associated with a number of computer instructions in the source code, wherein at least one of the computer instructions comprises a function enclosed by a macro. The processors create a data structure based on the information records and generate an index of identifiers in the data structure based on debug information of the computer instructions, wherein the index comprises respective identifying entries for the computer instructions. The processors update information records according to the identifying entries in the data structure.

20 Claims, 17 Drawing Sheets

1100

START

1102 — RECEIVE A COMPUTER PROGRAM, INCLUDING A SOURCE CODE

1104 — GENERATE A NUMBER OF INFORMATION RECORDS ASSOCIATED WITH ONE OR MORE COMPUTER INSTRUCTIONS IN THE SOURCE CODE, WHEREIN AT LEAST ONE OF THE COMPUTER INSTRUCTIONS COMPRISES A FUNCTION ENCLOSED BY A MACRO

1106 — CREATE A DATA STRUCTURE BASED ON THE INFORMATION RECORDS

1108 — GENERATE AN INDEX OF IDENTIFIERS IN THE DATA STRUCTURE BASED ON DEBUG INFORMATION OF THE COMPUTER INSTRUCTIONS, WHEREIN THE INDEX COMPRISES RESPECTIVE IDENTIFYING ENTRIES FOR THE COMPUTER INSTRUCTIONS

1110 — UPDATE THE INFORMATION RECORDS ACCORDING TO THE IDENTIFYING ENTRIES IN THE DATA STRUCTURE

END

(56)                References Cited

U.S. PATENT DOCUMENTS

| | | | |
|---|---|---|---|
| 2010/0153927 | A1 | 6/2010 | Stall et al. |
| 2011/0107308 | A1* | 5/2011 | Cooper ............... G06F 11/3644 |
| | | | 717/127 |
| 2012/0110553 | A1 | 5/2012 | Bates et al. |
| 2015/0033211 | A1* | 1/2015 | Bates .................. G06F 11/3636 |
| | | | 717/129 |
| 2023/0115334 | A1 | 4/2023 | Huang et al. |
| 2023/0259444 | A1 | 8/2023 | Chen et al. |

OTHER PUBLICATIONS

McDowell, Charles E., and David P. Helmbold. "Debugging concurrent programs." ACM Computing Surveys (CSUR) 21.4 (1989): pp. 593-622. (Year: 1989).*

Li, Xiangqi, and Matthew Flatt. "Debugging with domain-specific events via macros." Proceedings of the 10th ACM SIGPLAN International Conference on Software Language Engineering. 2017. pp. 91-102. (Year: 2017).*

Kirschner, Lukas, Ezekiel Soremekun, and Andreas Zeller. "Debugging inputs." Proceedings of the ACM/IEEE 42nd International Conference on Software Engineering. 2020. pp. 75-86. (Year: 2020).*

Sookoor, Tamim, et al. "Macrodebugging: global views of distributed program execution." Proceedings of the 7th ACM Conference on Embedded Networked Sensor Systems. 2009. pp. 141-154. (Year: 2009).*

Stallman, Richard, Roland Pesch, and Stan Shebs. "Debugging with GDB." Free Software Foundation 675 (1988). pp. 255-266. ( Year: 1988).*

"GDB: The GNU Project Debugger," Copyright Free Software Foundation, Inc., accessed Aug. 9, 2022, last modified Jun. 7, 2022, 3 pages. https://www.sourceware.org/gdb/.

"Macros (Debugging with ROCGDB)," Copyright Advanced Micro Devices, Inc., last updated Feb. 1, 2022, 4 pages. https://docs.amd.com/bundle/ROCDebugger-User-Guide-v5.0/page/Macros.html.

Anonymous, "Method to enable macros debugging, " An IP.com Prior Art Database Technical Disclosure, IPCOM000202015D, Dec. 1, 2010, 7 pages. https://priorart.ip.com/IPCOM/000202015.

* cited by examiner

406

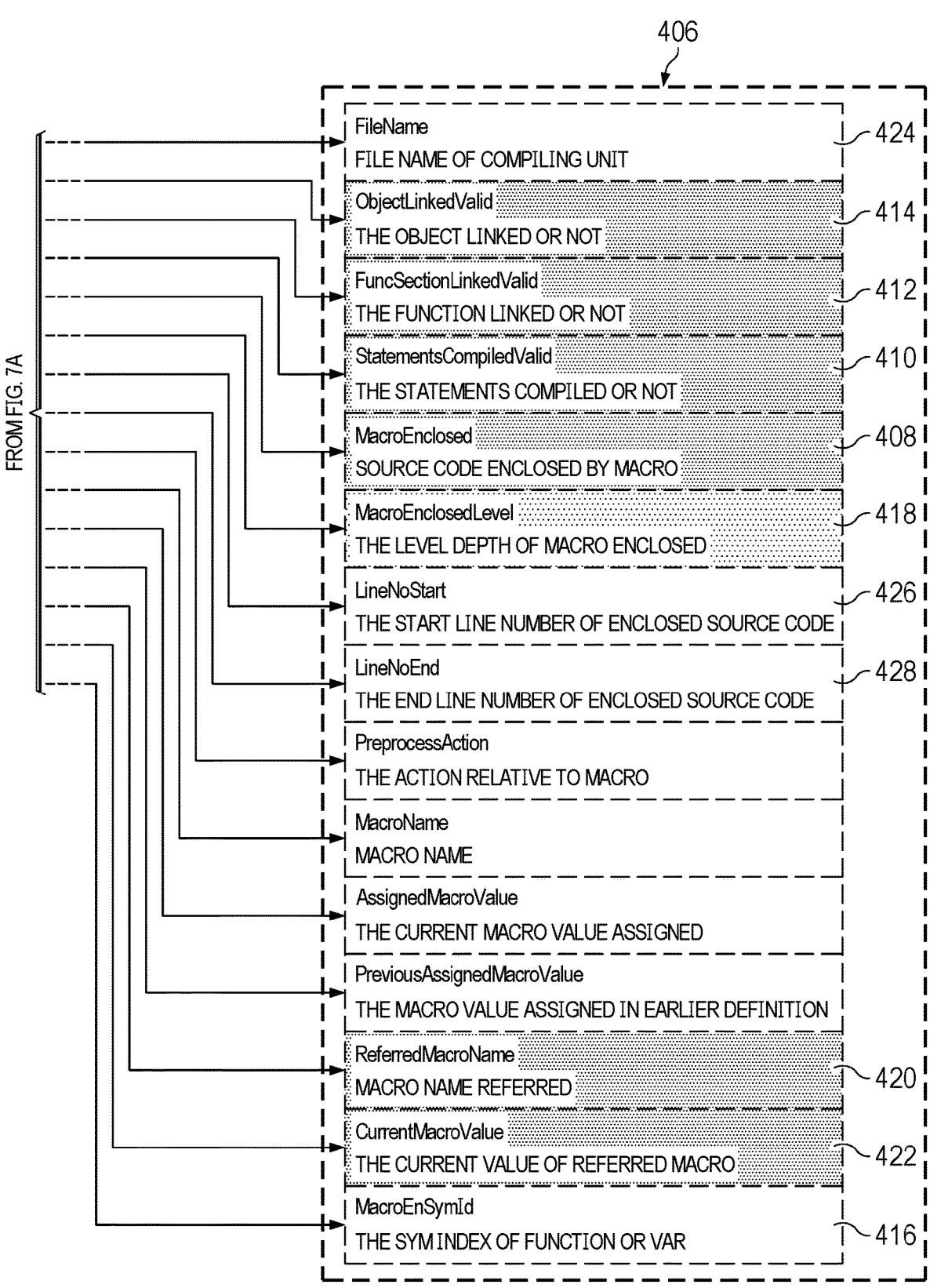

FileName
FILE NAME OF COMPILING UNIT — 424

ObjectLinkedValid
THE OBJECT LINKED OR NOT — 414

FuncSectionLinkedValid
THE FUNCTION LINKED OR NOT — 412

StatementsCompiledValid
THE STATEMENTS COMPILED OR NOT — 410

MacroEnclosed
SOURCE CODE ENCLOSED BY MACRO — 408

MacroEnclosedLevel
THE LEVEL DEPTH OF MACRO ENCLOSED — 418

LineNoStart
THE START LINE NUMBER OF ENCLOSED SOURCE CODE — 426

LineNoEnd
THE END LINE NUMBER OF ENCLOSED SOURCE CODE — 428

PreprocessAction
THE ACTION RELATIVE TO MACRO

MacroName
MACRO NAME

AssignedMacroValue
THE CURRENT MACRO VALUE ASSIGNED

PreviousAssignedMacroValue
THE MACRO VALUE ASSIGNED IN EARLIER DEFINITION

ReferredMacroName
MACRO NAME REFERRED — 420

CurrentMacroValue
THE CURRENT VALUE OF REFERRED MACRO — 422

MacroEnSymId
THE SYM INDEX OF FUNCTION OR VAR — 416

FROM FIG. 7A

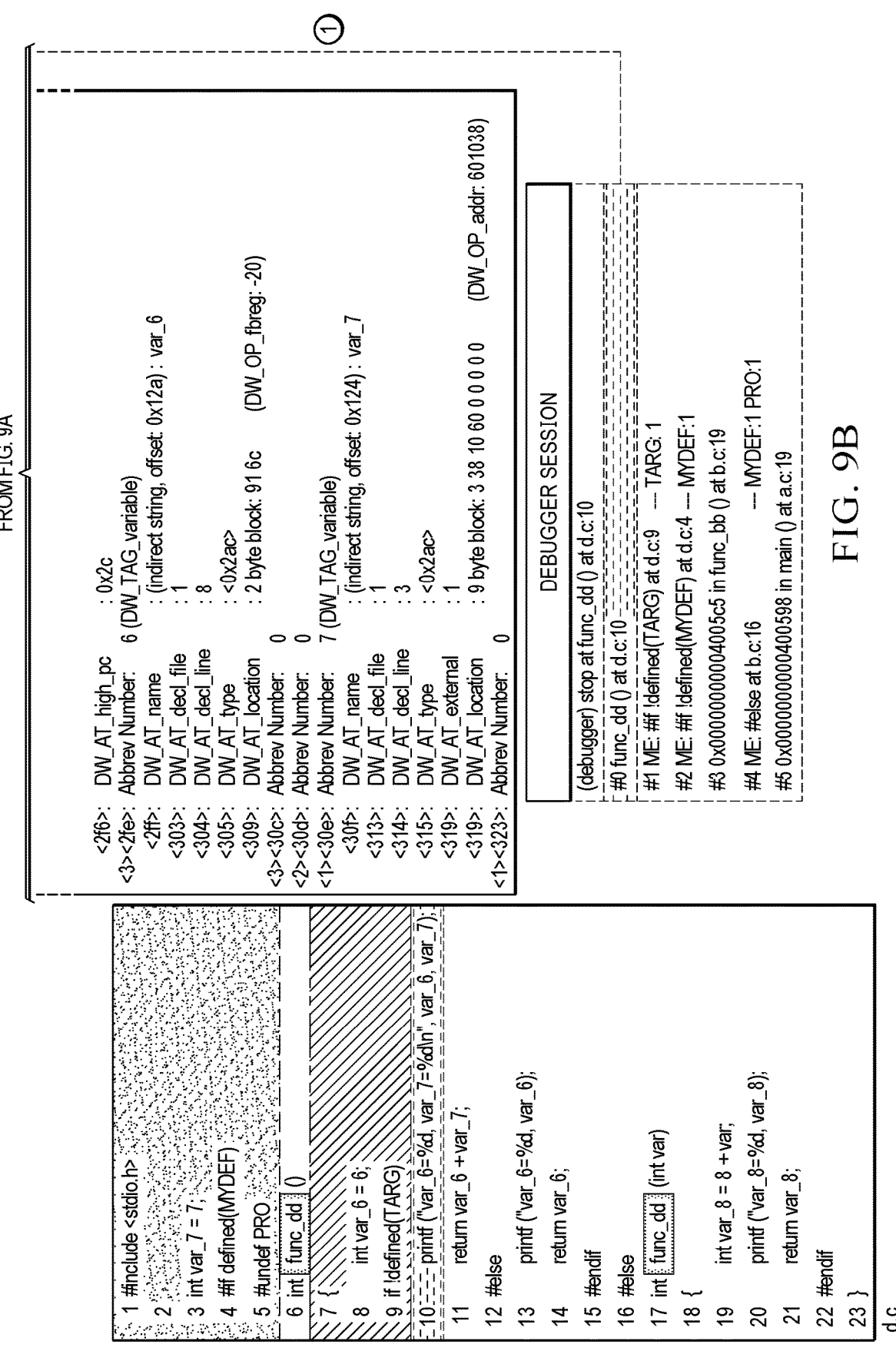

FROM FIG. 9A

| | | |
|---|---|---|
| <2f6>: | DW_AT_high_pc | : 0x2c |
| <3><2fe>: | Abbrev Number: | 6 (DW_TAG_variable) |
| <2ff>: | DW_AT_name | : (indirect string, offset: 0x12a) : var_6 |
| <303>: | DW_AT_decl_file | : 1 |
| <304>: | DW_AT_decl_line | : 8 |
| <305>: | DW_AT_type | : <0x2ac> |
| <309>: | DW_AT_location | : 2 byte block: 91 6c    (DW_OP_fbreg: -20) |
| <3><30c>: | Abbrev Number: | 0 |
| <2><30d>: | Abbrev Number: | 0 |
| <1><30e>: | Abbrev Number: | 7 (DW_TAG_variable) |
| <30f>: | DW_AT_name | : (indirect string, offset: 0x124) : var_7 |
| <313>: | DW_AT_decl_file | : 1 |
| <314>: | DW_AT_decl_line | : 3 |
| <315>: | DW_AT_type | : <0x2ac> |
| <319>: | DW_AT_external | : 1 |
| <319>: | DW_AT_location | : 9 byte block: 3 38 10 60 0 0 0 0 0    (DW_OP_addr: 601038) |
| <1><323>: | Abbrev Number: | 0 |

DEBUGGER SESSION (debugger) stop at func_dd () at d.c:10
0 func_dd () at d.c:10
1 ME: #if !defined(TARG) at d.c:9    — TARG: 1
2 ME: #if !defined(MYDEF) at d.c:4 — MYDEF:1
3 0x00000000004005c5 in func_bb () at b.c:19
4 ME: #else at b.c:16        —MYDEF:1 PRO:1
5 0x0000000000400598 in main () at a.c:19

FIG. 9B

```
1  #include <stdio.h>
2
3  int var_7 = 7;
4  #if defined(MYDEF)
5  #undef PRO
6  int func_dd ()
7  {
8      int var_6 = 6;
9  if !defined(TARG)
10     printf ("var_6=%d, var_7=%d\n", var_6, var_7);
11     return var_6 + var_7;
12  #else
13     printf ("var_6=%d, var_6);
14     return var_6;
15  #endif
16  #else
17  int func_dd (int var)
18  {
19     int var_8 = 8 + var;
20     printf ("var_8=%d, var_8);
21     return var_8;
22  #endif
23  }
```
d.c

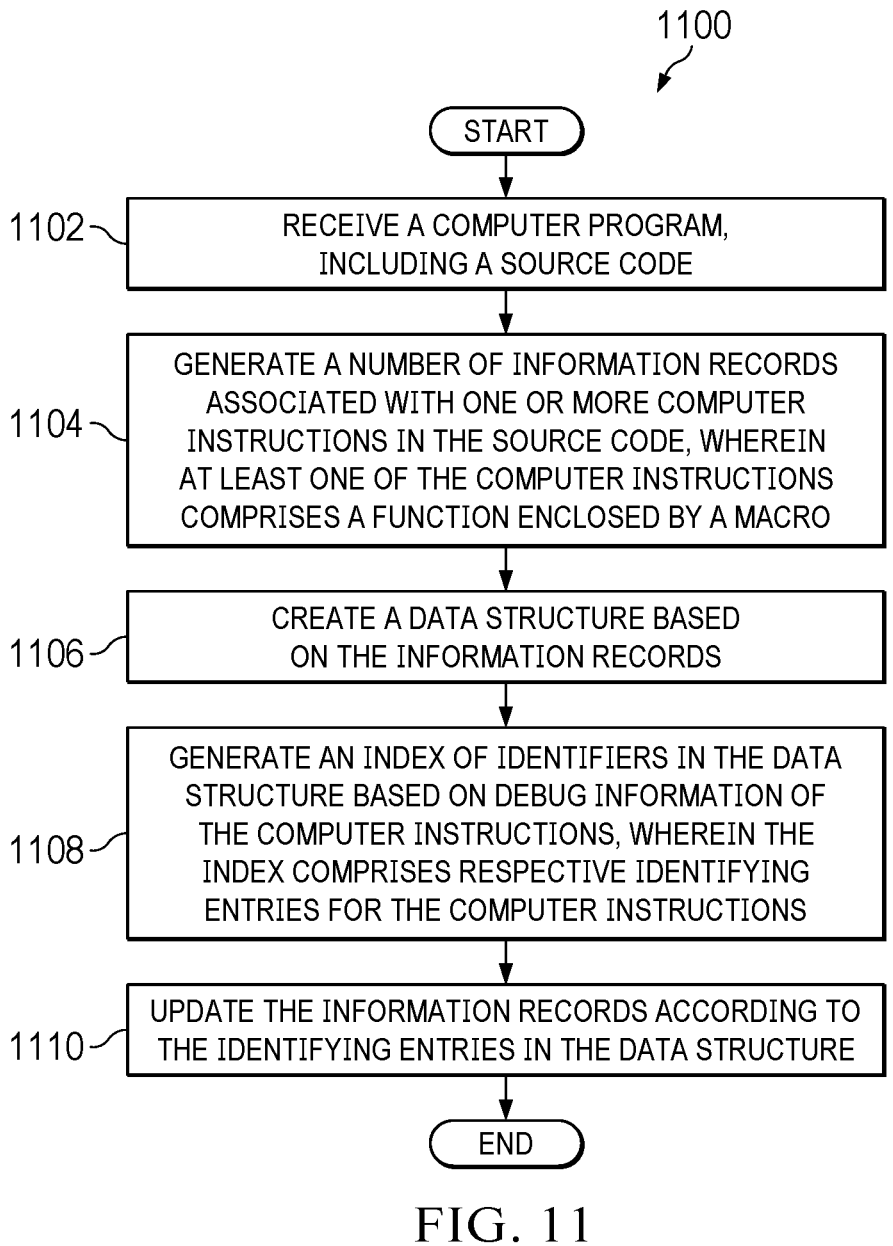

1100

START

1102 — RECEIVE A COMPUTER PROGRAM, INCLUDING A SOURCE CODE

1104 — GENERATE A NUMBER OF INFORMATION RECORDS ASSOCIATED WITH ONE OR MORE COMPUTER INSTRUCTIONS IN THE SOURCE CODE, WHEREIN AT LEAST ONE OF THE COMPUTER INSTRUCTIONS COMPRISES A FUNCTION ENCLOSED BY A MACRO

1106 — CREATE A DATA STRUCTURE BASED ON THE INFORMATION RECORDS

1108 — GENERATE AN INDEX OF IDENTIFIERS IN THE DATA STRUCTURE BASED ON DEBUG INFORMATION OF THE COMPUTER INSTRUCTIONS, WHEREIN THE INDEX COMPRISES RESPECTIVE IDENTIFYING ENTRIES FOR THE COMPUTER INSTRUCTIONS

1110 — UPDATE THE INFORMATION RECORDS ACCORDING TO THE IDENTIFYING ENTRIES IN THE DATA STRUCTURE

END

FIG. 11

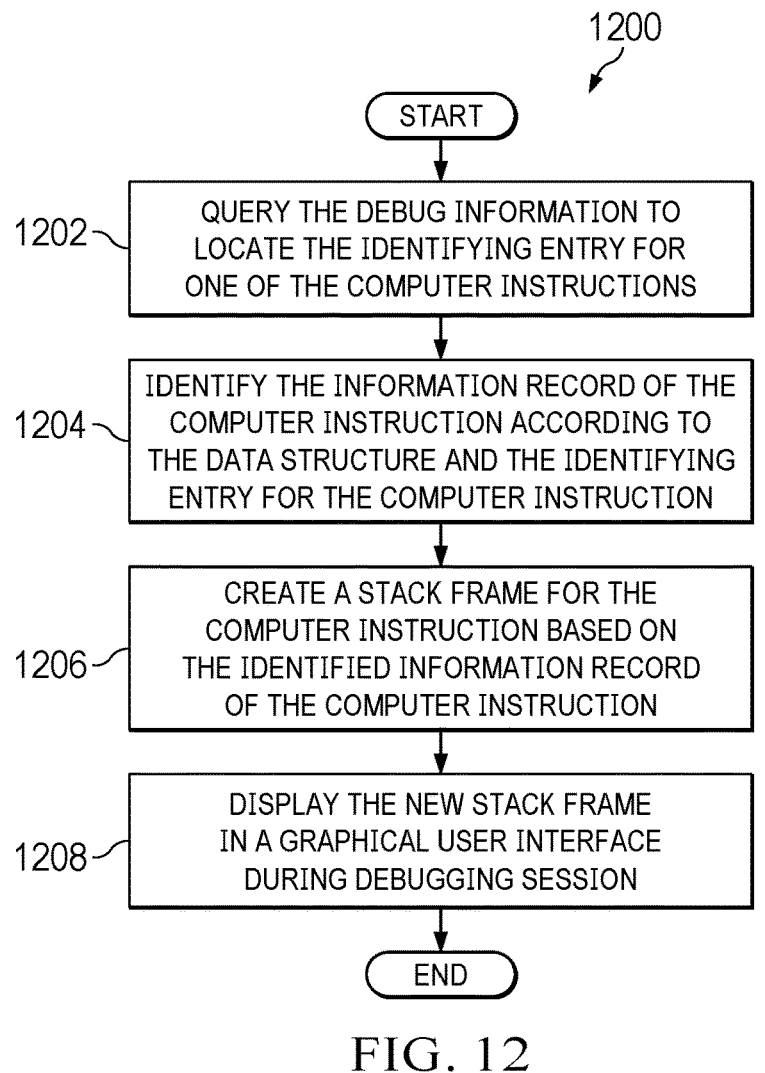

1200

START

1202 — QUERY THE DEBUG INFORMATION TO LOCATE THE IDENTIFYING ENTRY FOR ONE OF THE COMPUTER INSTRUCTIONS

1204 — IDENTIFY THE INFORMATION RECORD OF THE COMPUTER INSTRUCTION ACCORDING TO THE DATA STRUCTURE AND THE IDENTIFYING ENTRY FOR THE COMPUTER INSTRUCTION

1206 — CREATE A STACK FRAME FOR THE COMPUTER INSTRUCTION BASED ON THE IDENTIFIED INFORMATION RECORD OF THE COMPUTER INSTRUCTION

1208 — DISPLAY THE NEW STACK FRAME IN A GRAPHICAL USER INTERFACE DURING DEBUGGING SESSION

END

FIG. 12

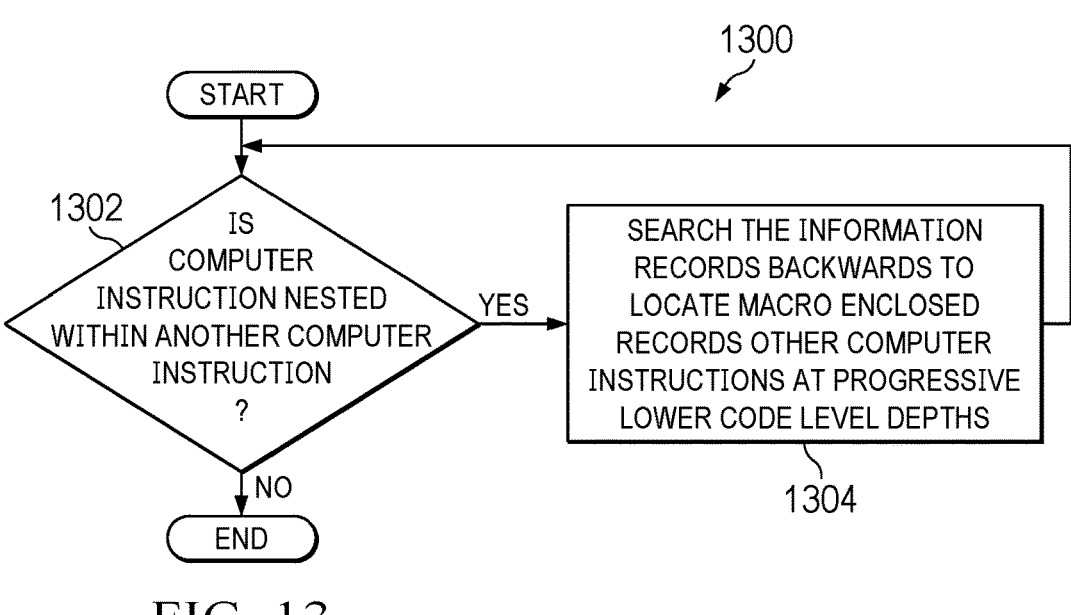

1300

START

1302   IS COMPUTER INSTRUCTION NESTED WITHIN ANOTHER COMPUTER INSTRUCTION ?

YES — SEARCH THE INFORMATION RECORDS BACKWARDS TO LOCATE MACRO ENCLOSED RECORDS OTHER COMPUTER INSTRUCTIONS AT PROGRESSIVE LOWER CODE LEVEL DEPTHS

1304

NO

END

FIG. 13

STACK FRAME GENERATION FOR SOURCE CODE ENCLOSED BY MACROS

BACKGROUND

1. Field

The present disclosure relates generally to an improved computing system, and more specifically to a method for generating a stack frame for source code enclosed by macros during a debugging session.

2. Background

Porting open-source computer programs from one platform or source to another is important for allowing the open source computer programs to be used on several platforms. In a cloud computing platform, open source programs are available to be used for certain functionality such as container support.

Porting application or open source programs across different platforms requires various development tools such as compilers, debugging tools, and performance libraries. However, developers can still run into issues with build, performance, or runtime errors during porting.

Therefore, it would be desirable to have a method and apparatus that take into account at least some of the issues discussed above, as well as other possible issues.

SUMMARY

An illustrative embodiment provides a computer implemented method for debugging computer instructions. The method comprises using a number of processors to receive a computer program, including a source code and generate a number of information records associated with a number of computer instructions in the source code, wherein at least one of the computer instructions comprises a function enclosed by a macro. The processors create a data structure based on the information records and generate an index of identifiers in the data structure based on debug information of the computer instructions, wherein the index comprises respective identifying entries for the computer instructions. The processors update information records according to the identifying entries in the data structure. According to other illustrative embodiments, a computer system and a computer program product for debugging computer instructions are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7B depicts a detailed example of information records with annotations in accordance with an illustrative embodiment;

FIG. 9B depicts a data flow diagram of debugger components operations in accordance with an illustrative embodiment;

FIG. 11 is a flowchart of a process for debugging computer instructions in accordance with an illustrative embodiment;

FIG. 12 is a flowchart of a process for creating a stack frame of information records for computer instructions in accordance with an illustrative embodiment;

FIG. 13 is a flowchart of a process for identifying nested computer instructions in accordance with an illustrative embodiment.

DETAILED DESCRIPTION

Figure 1:
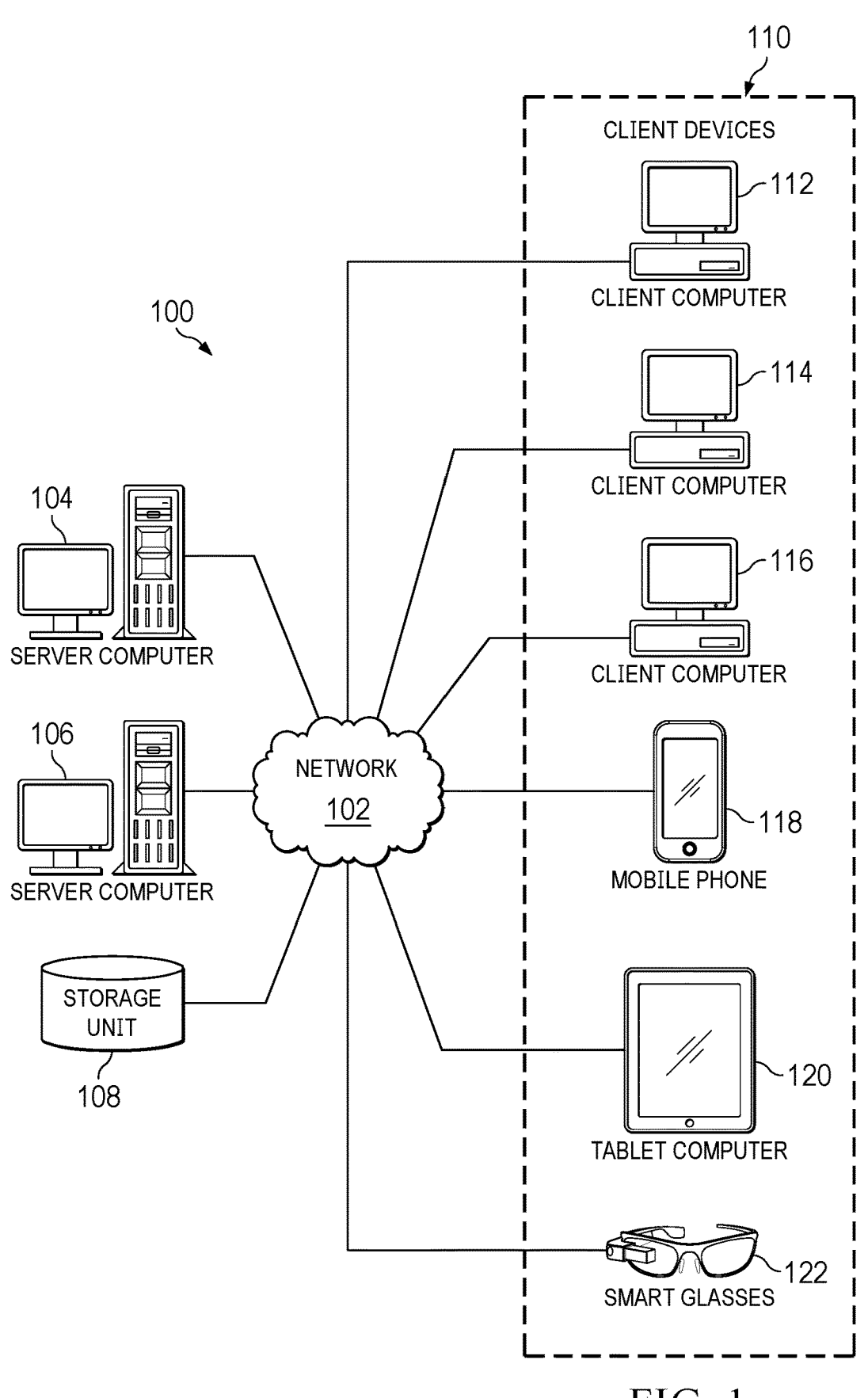
FIG. 1 depicts a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the fore-going. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may com-prise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, con-figuration data for integrated circuitry, or either source code or object code written in any combination of one or more programming languages, including an object oriented pro-gramming language such as Smalltalk, C++, or the like, and procedural programming languages, such as the "C" pro-gramming language or similar programming languages. The computer readable program instructions may execute entirely on the user's computer, partly on the user's com-puter, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program prod-ucts according to embodiments of the invention. It will be understood that each block of the flowchart illustrations and/or block diagrams, and combinations of blocks in the flowchart illustrations and/or block diagrams, can be imple-mented by computer readable program instructions.

These computer readable program instructions may be provided to a processor of a computer, or other program-mable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data process-ing apparatus, or other device to cause a series of operational steps to be performed on the computer, other programmable apparatus or other device to produce a computer imple-mented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer pro-gram products according to various embodiments of the present invention. In this regard, each block in the flowchart or block diagrams may represent a module, segment, or portion of instructions, which comprises one or more executable instructions for implementing the specified logi-cal function(s). In some alternative implementations, the functions noted in the blocks may occur out of the order noted in the Figures. For example, two blocks shown in succession may, in fact, be accomplished as one step, executed concurrently, substantially concurrently, in a par-tially or wholly temporally overlapping manner, or the blocks may sometimes be executed in the reverse order, depending upon the functionality involved. It will also be noted that each block of the block diagrams and/or flowchart illustration, and combinations of blocks in the block dia-grams and/or flowchart illustration, can be implemented by special purpose hardware-based systems that perform the specified functions or acts or carry out combinations of special purpose hardware and computer instructions.

The illustrative embodiments recognize and take into account one or more different considerations. The illustra-tive embodiments recognize and take into account that huge amounts of conditional codes with code blocks selected by preprocessor directives are used in porting open sources programs across different platforms, compilers, libraries, and head files.

The illustrative embodiments also recognize and take into account that autotools and library tools are used in large open-source projects to provide configuration for different platforms. The illustrative embodiments also recognize and take into account that using autotools and library tools also increases the complexity of understanding the code structure and identifying the root of bugs during a debugging session, especially when multiple macro condition sets are used on different platforms.

The illustrative embodiments provide a method to support debugging of computer instructions enclosed by a macro in a large-scale project. The illustrative embodiments map the information records associated with computer instructions enclosed by macros with bugging information of computer instructions enclosed by macros to generate a data structure that includes the relational information between the information associated with computer instructions enclosed by macros and debug information computer instructions enclosed by macros for efficient identification of defects in computer instructions during a debugging session.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In this illustrative example, storage unit 108 can be a centralized storage for network 102 that is independent of client devices in client devices 110. In another illustrative example, information can be stored and distributed manner in client devices 110, server computer 104, and server computer 106.

In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

A macro (short for macro instruction) is a programmable pattern that translates a sequence of inputs to a preset sequence of outputs. A macro provides a single program statement in place of a sequence of computing instructions. In an illustrative embodiment, the preprocessor is configured to generate information records that direct the debugger to set one or more breakpoints at selected computer instructions enclosed by the macros ("macro enclosed" codes or records). Breakpoints can be used to cause a debugger to pause at the code line indicated by a breakpoint. At this point, validated parts of code can be run while pausing execution of the macro in areas that need further testing.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

In an illustrative example, the information records include a "macroenclosedlevel" field (also referred to as a "MacroEnclosedLevel" field) that is populated by the preprocessor based on code files that match a macro condition. The MacroEnclosedLevel field can include a value for one of a plurality of code level depths. A level depth of a line of code indicates whether the line is nested within a piece of code. For example, a line of code is assigned with a primary level if the line is not nested. In this example, a numerical value can be used to represent the level depth of a line of code. Therefore, a code line is level zero when assigned with the primary level, a code line is level one if nested within a level zero piece of code, and a code line is level two if nested in a level one piece of code, etc. There may be any number of levels that could be defined. Breakpoint Locate and Breakpoint Build components in the debugger locate and set breakpoints during the validation process.

Figure 2:
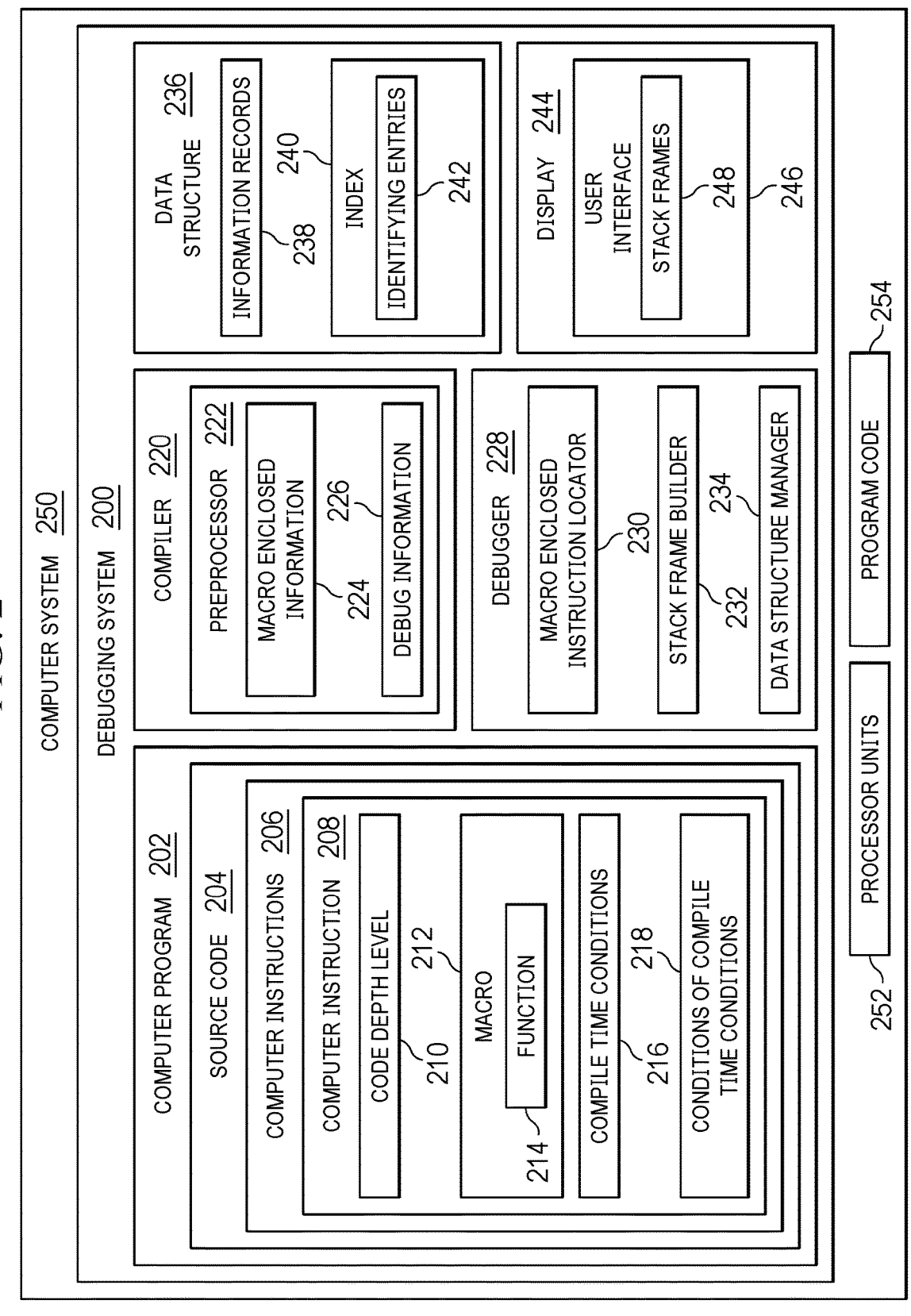
FIG. 2 depicts a block diagram of a debugging system in accordance with an illustrative embodiment.

FIG. 2 depicts a block diagram of a debugging system in accordance with an illustrative embodiment. Debugging system 200 might be implemented in network data processing system 100 in FIG. 1.

Debugging system 200 receives a computer program 202 that is intended to be ported to execute on a target computing platform. Computer program 202 comprises source code 204. Source code 204 comprises a number of computer instructions 206. Each computer instruction 208 within computer instructions 206 has a code depth level 210. The computer instruction 208 might comprise a function 214 that is enclosed within a macro 212. Computer instruction 208 may comprise information about compile time conditions 216 and conditions of compile time conditions 218 (explained below).

Debugging system 200 comprises a compiler 220 that includes a preprocessor 222. Preprocessor 222 preprocesses source code 204 to generate macro enclosed information 224 and debug information that may be used by debugger 228 (see FIG. 4). Debugger 228 comprises macro enclosed information locator 230 that allows the debugger 228 to locate computer instructions enclosed by a macro. Stack framer builder 232 allows the debugger 228 to build stack frames 248 for computer instructions enclosed by a macro. Data structure manager 234 allows the debugger 228 to create and maintain a data structure 236.

Data structure 236 contains information records 238 associated with the computer instructions 206. Data structure 236 also comprises an index 240 of identifying entries 242 for the computer instructions 206.

Stack frames 248 created by the debugger 228 may be displayed to a user in a user interface 246 in display 244. User interface 246 may be, e.g., a graphical user interface or command line user interface. Display 244 is a physical hardware system and includes one or more display devices on which a user interface such as user interface 246 can be displayed.

Display 244 can include at least one of a light emitting diode (LED) display, a liquid crystal display (LCD), an organic light emitting diode (OLED) display, a computer monitor, a projector, a flat panel display, a heads-up display (HUD), a head-mounted display (HMD), or some other suitable device that can output information for the visual presentation of information.

Debugging system 200 can be implemented in software, hardware, firmware, or a combination thereof. When software is used, the operations performed by debugging system 200 can be implemented in program code configured to run on hardware, such as a processor unit. When firmware is used, the operations performed by debugging system 200 can be implemented in program code and data and stored in persistent memory to run on a processor unit. When hardware is employed, the hardware can include circuits that operate to perform the operations in debugging system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
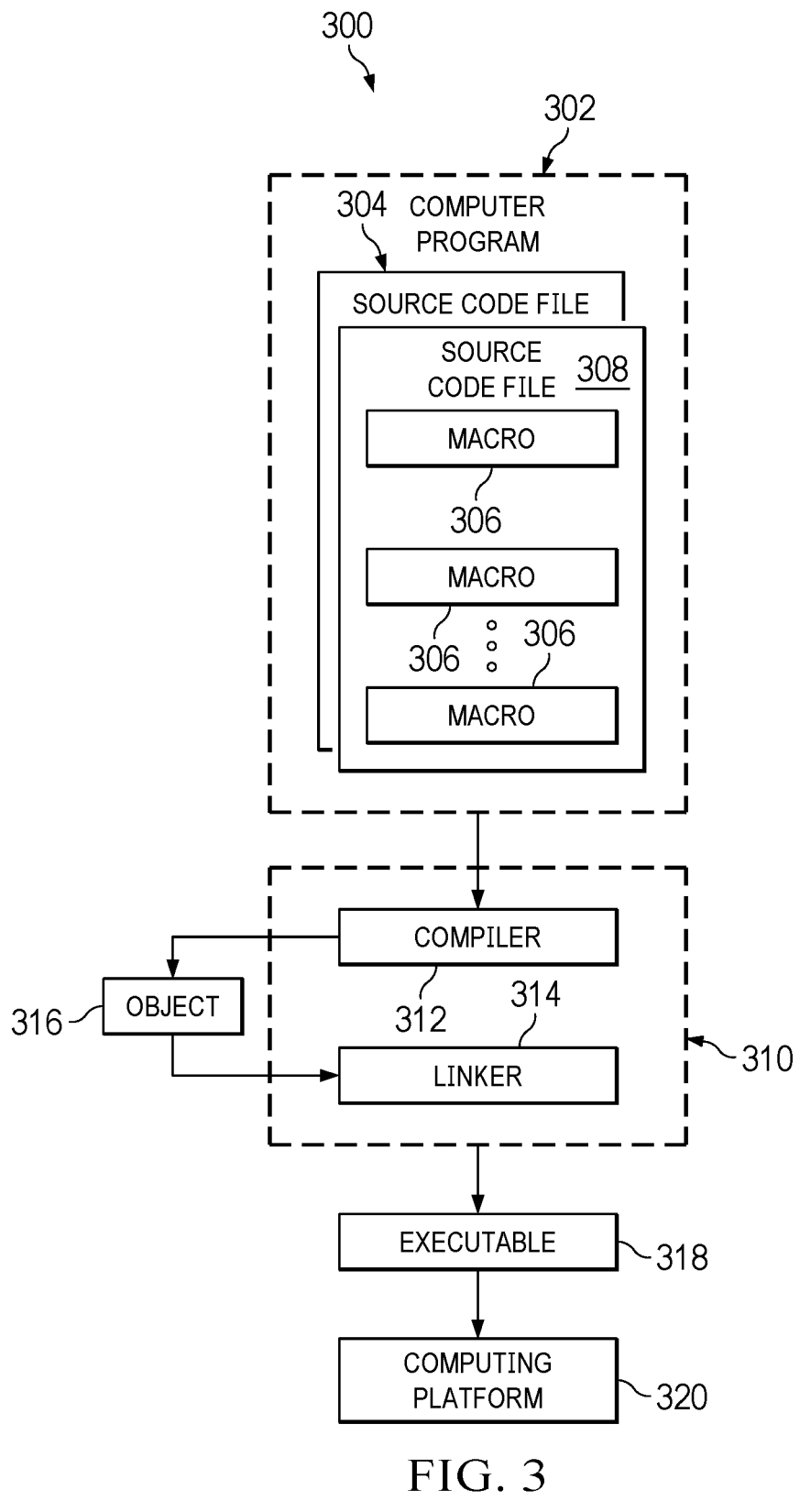
FIG. 3 depicts a diagram illustrating a system for debugging computer instruction in accordance with an illustrative embodiment.

FIG. 3 depicts a system for validating computer instructions enclosed by macros in accordance with an illustrative embodiment. In this illustrative example, system 300 includes components that can be implemented in hardware, such as the hardware shown in computer system 250 in FIG. 2.

System 300 includes a computer program 302 that is to be compiled by a development tool 310 to generate a corresponding object files 316. The computer program 302 may be written for a different computing platform and may be ported for execution on a target computing platform 320. The compiler 312 can be part of a development tool 310, such as an integrated development environment (IDE). The development tool 310 can also include a linker 314 that generates an executable file 318 based on the object files 316. The executable file 318 is executed on a target computing platform 320. In this illustrative example, the executable file 318 can include one or more files.

The compiler 312 generates the object files 316 specifically for the target computing platform 320. In an alternate example, the linker 314 generates the executable file 318 specifically for the target computing platform 320. In this example, a compiler and linker can be separate tools, with separate runtime instructions. As used herein, "compiling" or "building" the computer program 302 can include compiling, linking, and any suitable operations that can be required to convert the computer instructions in the computer program 302 into machine instructions that are executable by the target computing platform 320.

The target computing platform 320 can be a cloud computing platform architecture, an operating system, a processor architecture, or any suitable type of computing platform to which the computer program 302 is being ported. In other words, the computer program 302 may not have been developed specifically for the target computing platform

320. The compilation and linking by the development tool 310 facilitate executing the computer program 302 on the target computing platform 320. In an alternative example, the development tool 310 improves the efficiency of execution of the computer program 302 on the target computing platform 320.

As depicted, the computer program 302 can include one or more source code files, including, for example, a source code file 308, and a source code file 304. The computer program 302 can be open source program instructions. In this illustrative example, the computer program 302 can include hundreds, or thousands of source code files even though only two files are depicted in the present example. Additionally, each of source code file 304 and source code file 308 can include hundreds, or thousands of computer instructions. In this illustrative example, the source code files of the computer program 302 are organized in a hierarchical manner using a directory structure.

One or more of the source code files in the computer program 302 use macro 306. For example, the source code file 308 includes several macros 306. The depicted macros 306 can each be an instance of a different macro. In an illustrative example, the macros 306 can be associated with a conditional expansion dependent on one or more configurations of the compiler 312, so that a user can adjust compiler 312 prior to the execution of the compiler 312. In an alternative example, the conditional expansion can be dependent on one or more environmental settings of the target computing platform 320. For example, the conditional expansion can be dependent on operating system level variables and hardware type.

In another illustrative example, the conditional expansion can be dependent on runtime options that the user provides at time of execution of the development tool 310. In this illustrative example, the macros 306 that are used in the source code file 308 can be defined in the source code file 308, or any suitable file in the computer program 302, for example the source code file 304.

In this illustrative example, the development tool 310 can include a user interface that is used to interact with the source code file 304 and source code file 308. A user can navigate the directory structure, and perform operations such as adding, deleting, copying, pasting, moving, and editing with the source code files 304 and 308 of the computer program 302. The user interface displays the computer instructions of the computer program 302 using one or more contextual visual attributes. For example, computer instructions contents of different types of conditional statements, function calls, variables, keywords, and macros. Computer instructions content can be displayed using different colors, different fonts, or any other suitable visual attributes. In this illustrative example, the visual representation of the computer instructions can be adjusted by the development tool 310 based on the one or more contextual visual attributes.

Figure 4:
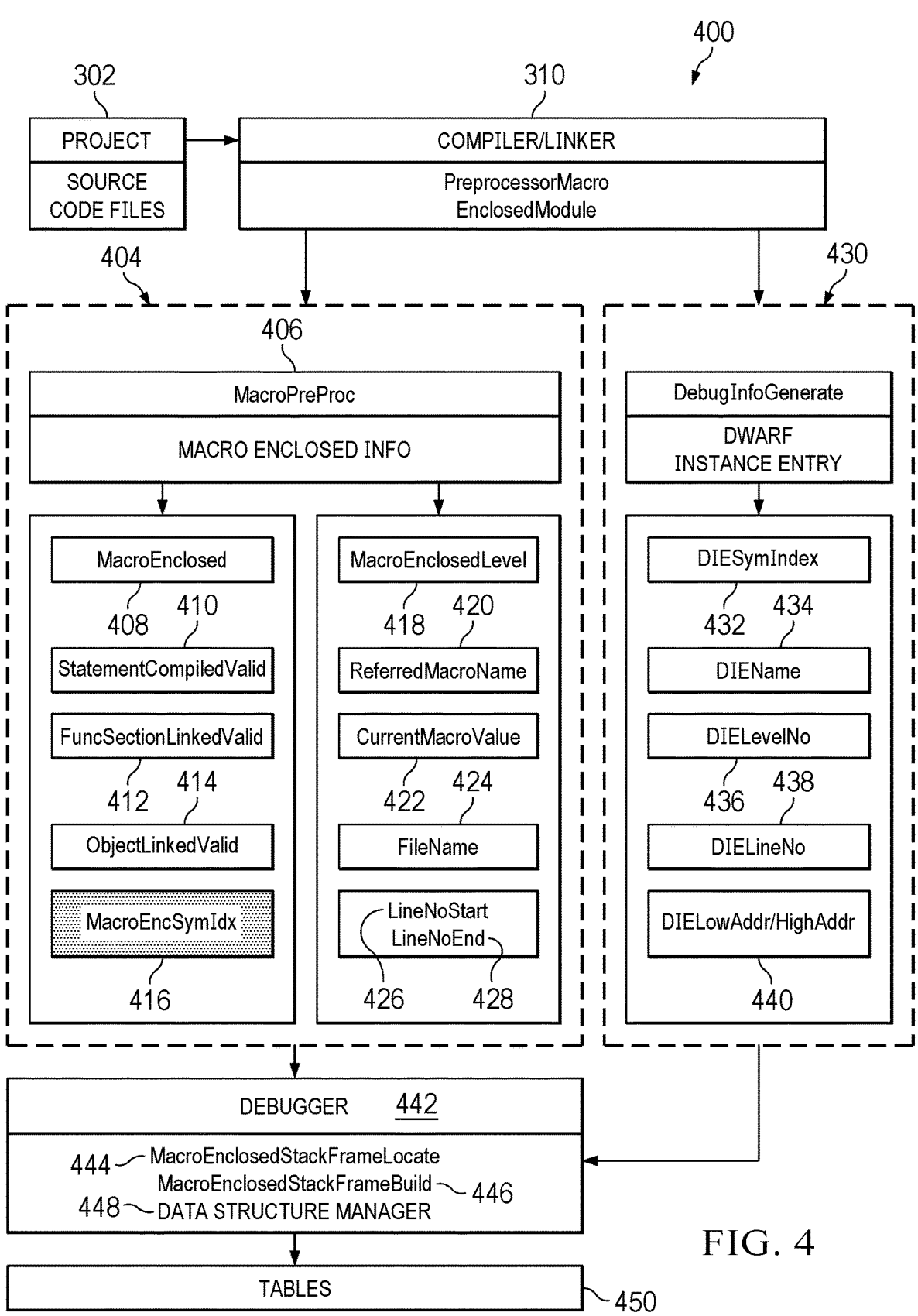
FIG. 4 depicts an architecture for a development tool in accordance with an illustrative embodiment.

FIG. 4 depicts a diagram illustrating an architecture for a development tool in accordance with an illustrative embodiment. Architecture 400 may be an example implementation of development tool 310 in FIG. 3. In the illustrative example, the same reference numeral may be used in more than one figure. This reuse of a reference numeral in different figures represents the same element in the different figures.

In this illustrative example, the development tool 310 can be used to facilitate identifying macros 306, compile time conditions, values of the compile time conditions, updating the user interface, and various other features of the technical solutions described herein. The architecture 400 of the system 300 includes a debugger 442 that receives a command to initiate identifying macros in the computer program 302. The command can be provided via a command-line, a setting configuration, or any other user interaction by the user.

The development tool 310 includes a preprocessor 404 that generates macro enclosed information 406 by analyzing the source code files of the computer program 302. In this illustrative example, macro enclosed information 406 can be an embodiment of information records 238 in FIG. 2. In one illustrative example, the macro enclosed information 406 can include compile time conditions, current values of the compile time conditions, assigned compile time condition values, macro names, preprocessing type, referred macro names, or any information generated by analyzing the source code files of the computer program 302.

In addition to macro enclosed information 406, the development tool 310 is configured to generate information used by the debugger 442 to debug source code files of computer program 302. This information is referred to as debug information 430, which may include any suitable data structure. In this illustrative example, the debug information 430 can be an information entry of debugging with attributed record format (DWARF). Here, DWARF uses a series of debugging information entries (DIEs) to define a low-level representation of a source program. Each debugging information entry consists of an identifying tag and a series of attributes. An entry or group of entries together provides a description of a corresponding entity in the source program. The tag specifies the class to which an entry belongs, and the attributes define the specific characteristics of the entry.

In the present example, the debug information 430 includes Debug Information Entries (DIEs) that describe the contents and usage of program source files. Examples of the debug information 430 include DIESymIndex 432, which lists the identifiers of DIEName 434, which is the file name of the compiling computer instruction of computer program 302, a DIELineNo 438 of instructions to be debugged, which can be represented by a starting line number LineNoStart 426 and an ending line number LineNoEnd 428 in macro enclosed information 406. Other debugging information includes DIElowAddr/HighAddress 440, which are the addresses of instructions to be debugged, and a DIELevelNo 436, which indicates the scope of computer instruction being complied. In this illustrative example, the scope is a representation of hierarchy for different code segments within computer program 302. For example, variables and functions within computer program 302 can be assigned with different scopes for the debugger 442 to efficiently identity code segments during a debugging session. In this example, a number of numerical symbols are used to represent the scope for different code segments within computer program 302.

In this illustrative example, the development tool 310 receives source code files 304 that include one or more conditional macros. A dynamic compile time condition is associated with the one or more conditional macros, so that the computer instructions in the conditional macros are compiled to object code only if the associated compile time condition is satisfied. If the compile time condition is not satisfied, the computer instructions in a conditional macro are not included in the object code.

In this illustrative example, compile time conditions can indicate a combination type of hardware and software of the target computing platform such as target computing platform 320 in FIG. 3. For example, a compile time condition can indicate that the macro is to be expanded only if the platform uses a particular operating system such as, LINUX®, AIX®, INTERIX®, Z/OS®, etc. Alternatively, the compile time condition can indicate that the macro 306 in FIG. 3 is to be expanded only if one or more other source code files (e.g., a header file) is included. In some illustrative examples, the expanded macro 306 can be an inclusion of additional source code files, such as a library, or an application programming interface. In addition, the expanded macro 306 can cause a particular type of hardware component or software component to be "mounted."

In this illustrative example, "mounting" includes acquiring access to the component such as recognizing, reading, and processing a file system structure, or a storage medium before registering the component for use. Several alternative operations can be performed by the computer instructions enclosed in the macro 306.

In this illustrative example, various types of information can be used by the preprocessor 404 to identify macros, as well as to set macro breakpoints within a macro (explained below). In this example, a breakpoint refers to a line of code at which the debugger 442 should pause execution of the macro operation.

The macro enclosed information 406 includes various macro enclosed fields in which corresponding values are populated. For example, a MacroEnclosed 408 includes a macro enclosed value that indicates whether a number of source code lines is enclosed by a macro, a StatementCompiledValid 410 includes a value that indicates whether a statement is compiled or not, a FuncSectionLinkValid 412 includes a value that indicates whether a function is linked, an ObjectLinkedValid 414 indicates whether an object code is linked to an executable file, and a MacroEncSymIdx 416 indicates an identifier of debugging information linked to a source code line of a computer instruction from computer program 302. In the present example, the identifiers in MacroEncSymIdx 416 can be extracted from DIES ymIndex 432.

In this illustrative example, MacroEnclosed 408 further includes information provided by the development tool 310 that can be used by the debugger 442 to set breakpoints at lines within a macro. The breakpoints are multi-level breakpoints that can be set for different level depths.

A MacroEnclosedLevel 418 provides information for the development tool 310 to direct the debugger 442 to set one or more breakpoints in a macro. The MacroEnclosedLevel 418 is assigned a macro enclosed level value by the preprocessor 404 (e.g., 0, 1 or 2, or higher) to indicate the level depth of an enclosed line or segment. The primary level of the MacroEnclosedLevel field 418 is zero and is increased by the preprocessor 404.

To support setting breakpoints, the macro enclosed information 406 can also include a ReferredMacroName 420, which indicates the name of a referred macro such as TARG, MYDEF, and PRO, a CurrentMacroValue 422, which indicates the current value of the referred macro, and FileName 424, which indicates the file name of the compiling computer instruction of computer program 302.

The debugger 442 can include a MacroEnclosedstackFrameLocate 444 that allows the debugger 442 to locate computer instructions enclosed by a macro by searching the identifiers in DIESymIndex 432. The debugger 442 further includes MacroEnclosedStackFrameBuild 446 that allows the debugger 442 to build stack frames for computer instructions enclosed by a macro.

In the present example, debugger 442 also include a data structure manager 448 to create and maintain tables 450. In this example, tables 450 includes relational information between MacroEncSymIdx 416, DIESymIndex 432, and other information in macro enclosed information 406 for efficient cross referencing and identification of debugging information of codes in computer program 302 during a debugging session. The illustration of tables 450 is provided as one illustrative example of a data structure that can be used. Other types of data structures can be used in addition to or in place of tables 450. Other data structures that can be used include, for example, linked lists, arrays, heaps, flat files, or any type of suitable data structure that can be used to search for information.

Figure 5:
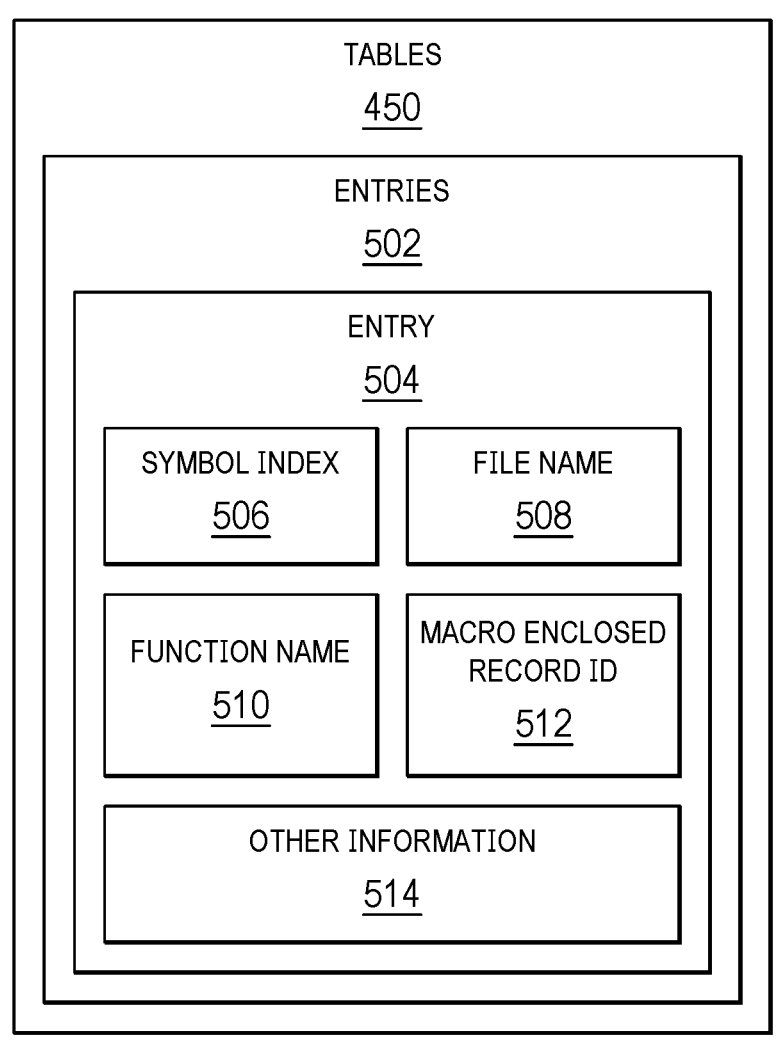
FIG. 5 depicts a block diagram of tables in accordance with an illustrative embodiment.

FIG. 5 depicts a detailed example of tables 450 from FIG. 4 in accordance with an illustrative embodiment of present disclosure. Tables 450 include a number of entries 502. Each entry 504 in entries 502 can further include information associated with a computer instruction enclosed by a macro, e.g., a computer instruction of source code file 308 of computer program 302 enclosed by a macro 306 in FIG. 3. In this illustrative example, entry 504 can include a symbol index 506 that comprises an identifier of debugging information linked to the source code line of the computer instruction. In this example, the symbol index 506 can be MacroEncSymIdx 416 in FIG. 4.

Entry 504 can further include file a name 508, which indicates the file name of the computer instruction. File name 508 may be FileName 424 of macro enclosed information 406 in FIG. 4. Entry 504 can also include a function name 510, which indicates the name of a function or variable of the compute instruction, and a Macro enclosed record ID 512, which is a numerical symbol assigned to each code segment within the computer instruction based on the line number of each code segment.

In addition, entry 504 can include other information 514 associated with the computer instruction and describe a property or feature of the computer instruction. It should be understood that entry 504 is only one embodiment of the present disclosure. For example, information in entry 504 can be added, deleted, or modified based on users' preference to suit users' needs.

Figure 6A:
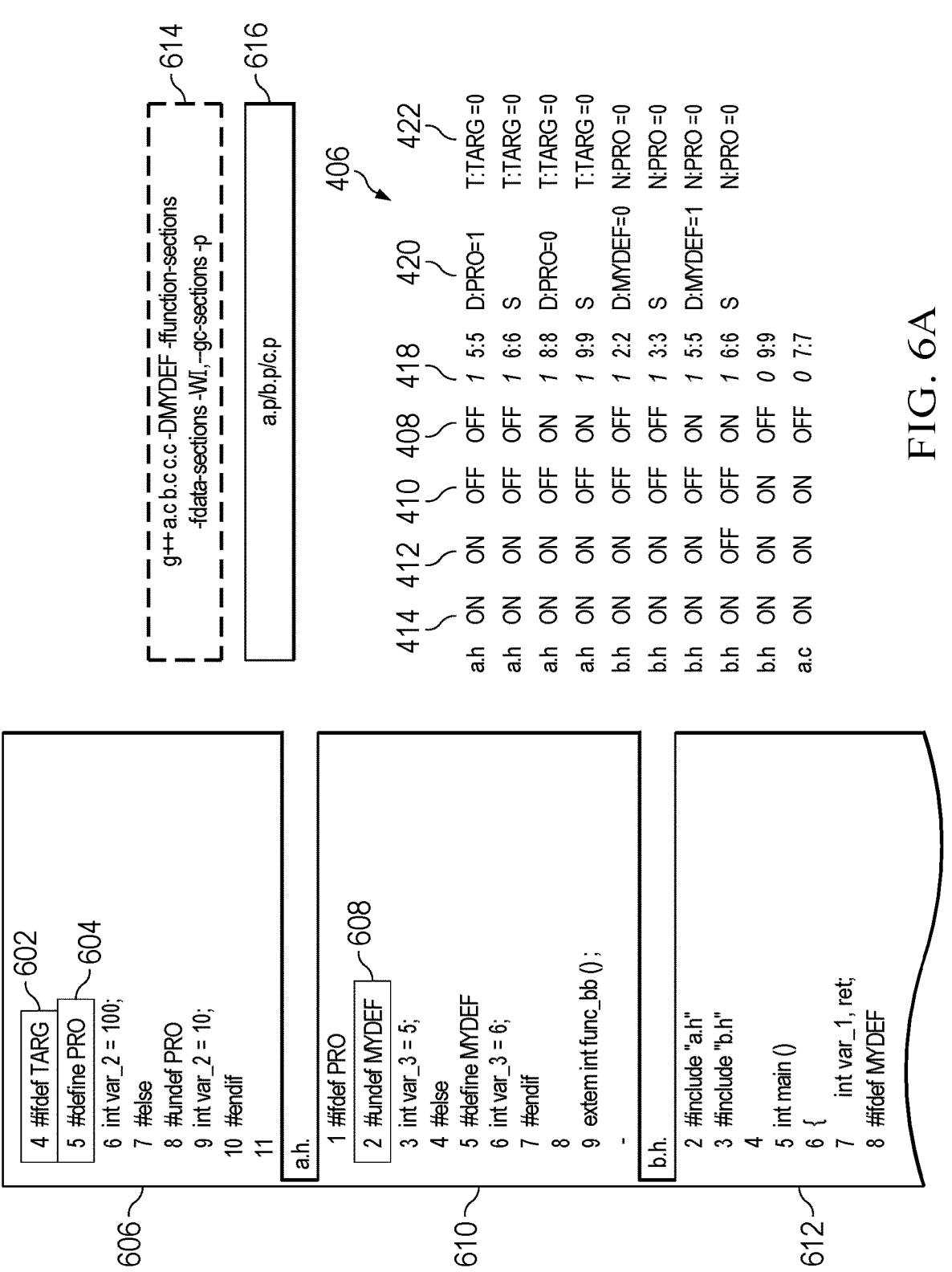
FIG. 6A depicts an example of source code information and information records generated by a compiler in accordance with an illustrative embodiment.
Figure 6B:
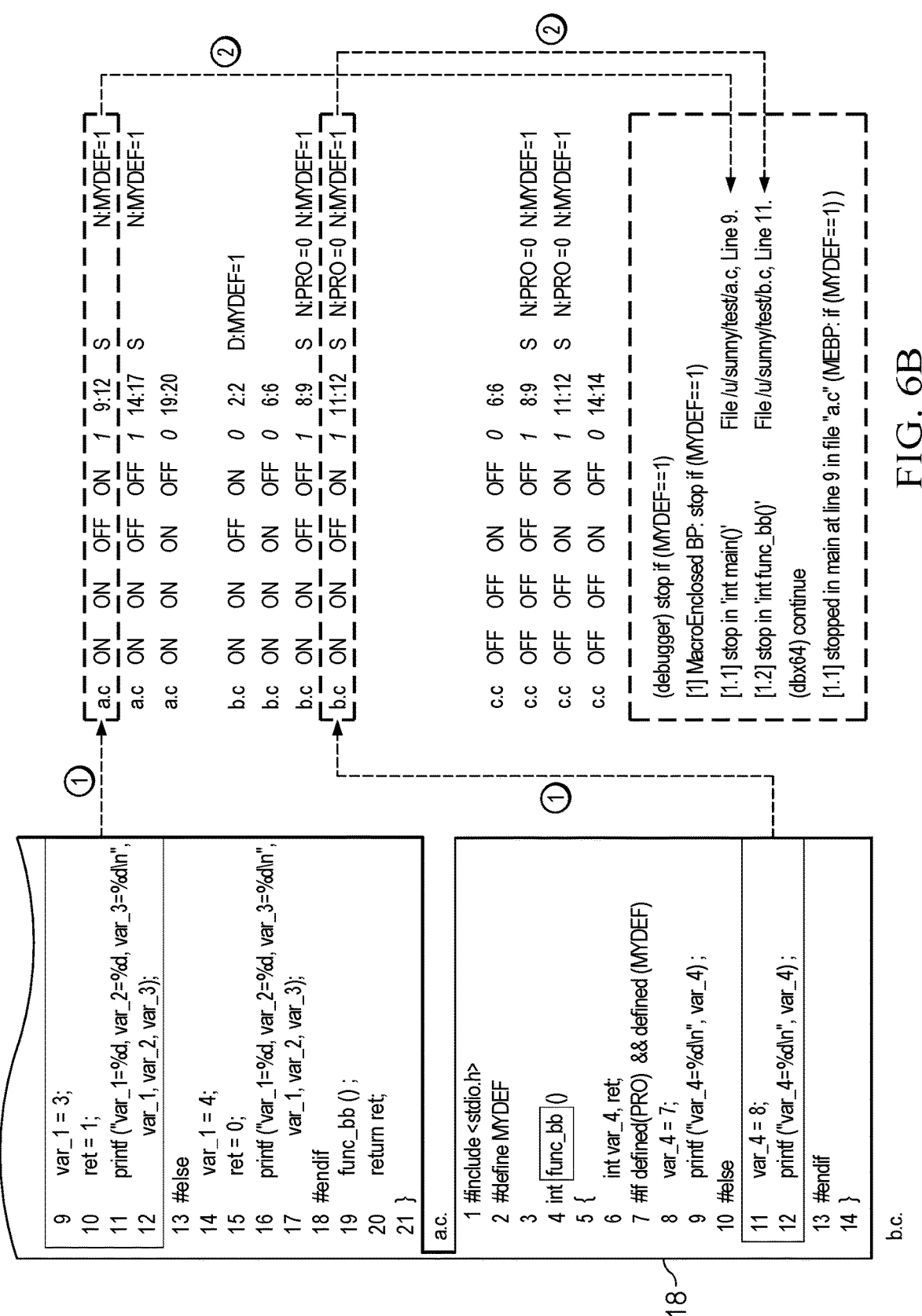
FIG. 6B depicts an example of source code information and information records generated by a compiler in accordance with an illustrative embodiment.

FIGS. 6A and 6B depict computer instructions enclosed by macros and information records associated with the computer instructions enclosed by macros in accordance with an illustrative embodiment. In this example, the computer instructions enclosed by macros can be computer instructions of computer program 302 in FIG. 4, and the information records associated with the computer instructions enclosed by macros can be macro enclosed information 406 in FIG. 4.

In this example, the option "-p" in a runtime command 614 triggers the generation of macro enclosed fields discussed above. The preprocessor type 'S' marks the source code scope enclosed by the macro, whereas 'D' marks the definition of macros. Other preprocessor types can be specified in other embodiments of the present invention.

In this illustrative example, three types of macros are used, including TARG 602, PRO 604, and MYDEF 608. The source code files include file 606 (a.h.), file 610 (b.h), file 612 (a.c.) and file 618 (b.c.). In this example, code segments at lines 9-12 of the file 612 should be compiled because the compile time condition of macro MYDEF 608 is defined in the runtime command 614 to initiate the compiling of code segments into a preprocessed file 616. The preprocessed file 616 is used subsequently to generate object code.

Figure 7A:
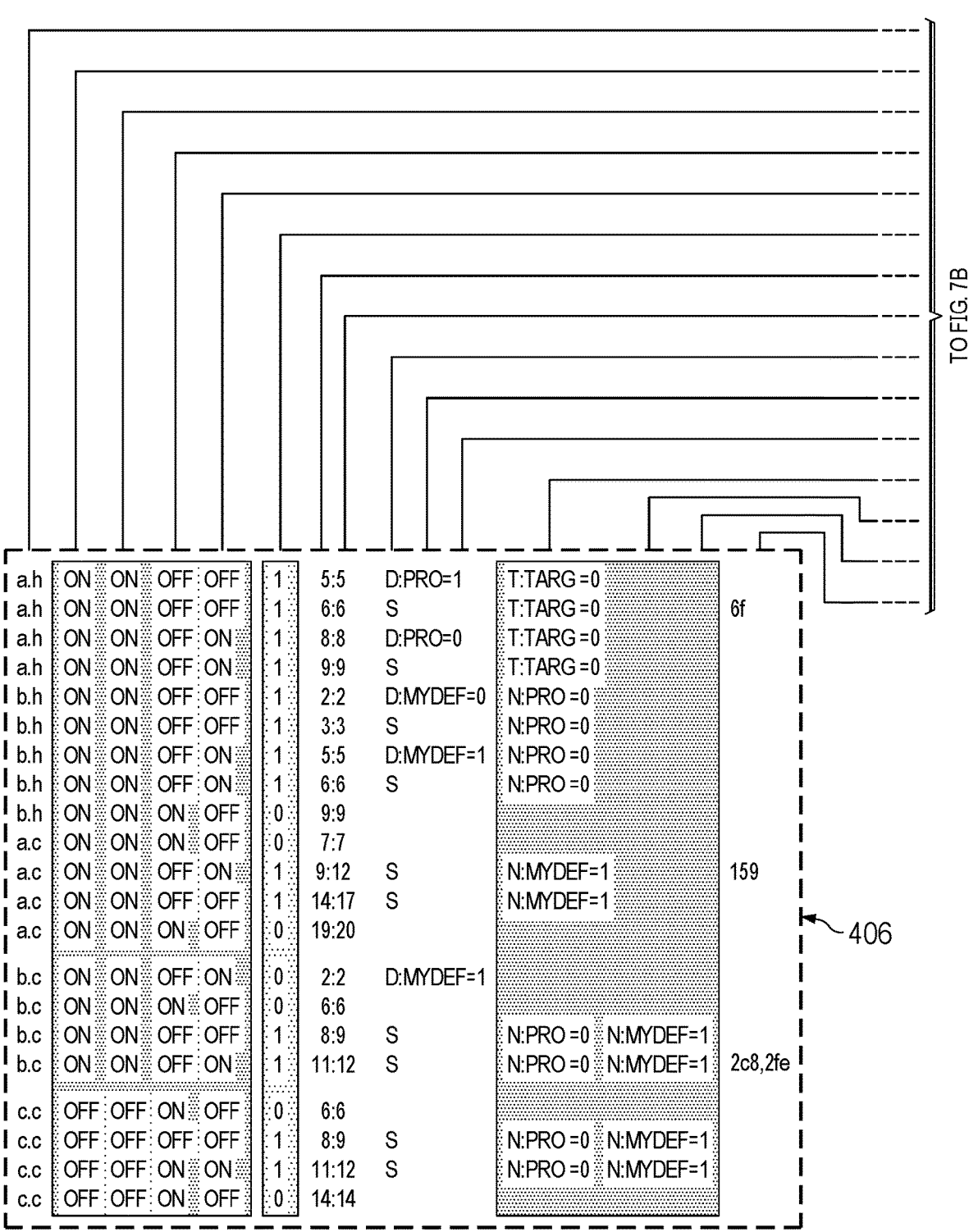
FIG. 7A depicts a detailed example of information records with annotations in accordance with an illustrative embodiment.

FIGS. 7A and 7B depict information records for computer instructions enclosed by macro in accordance with an illustrative embodiment. In this illustrative example, the information records can be macro enclosed information 406. FIG. 7 shows information records of computer instructions enclosed by a macro with annotations of the various fields shown in FIG. 4.

Figure 8A:
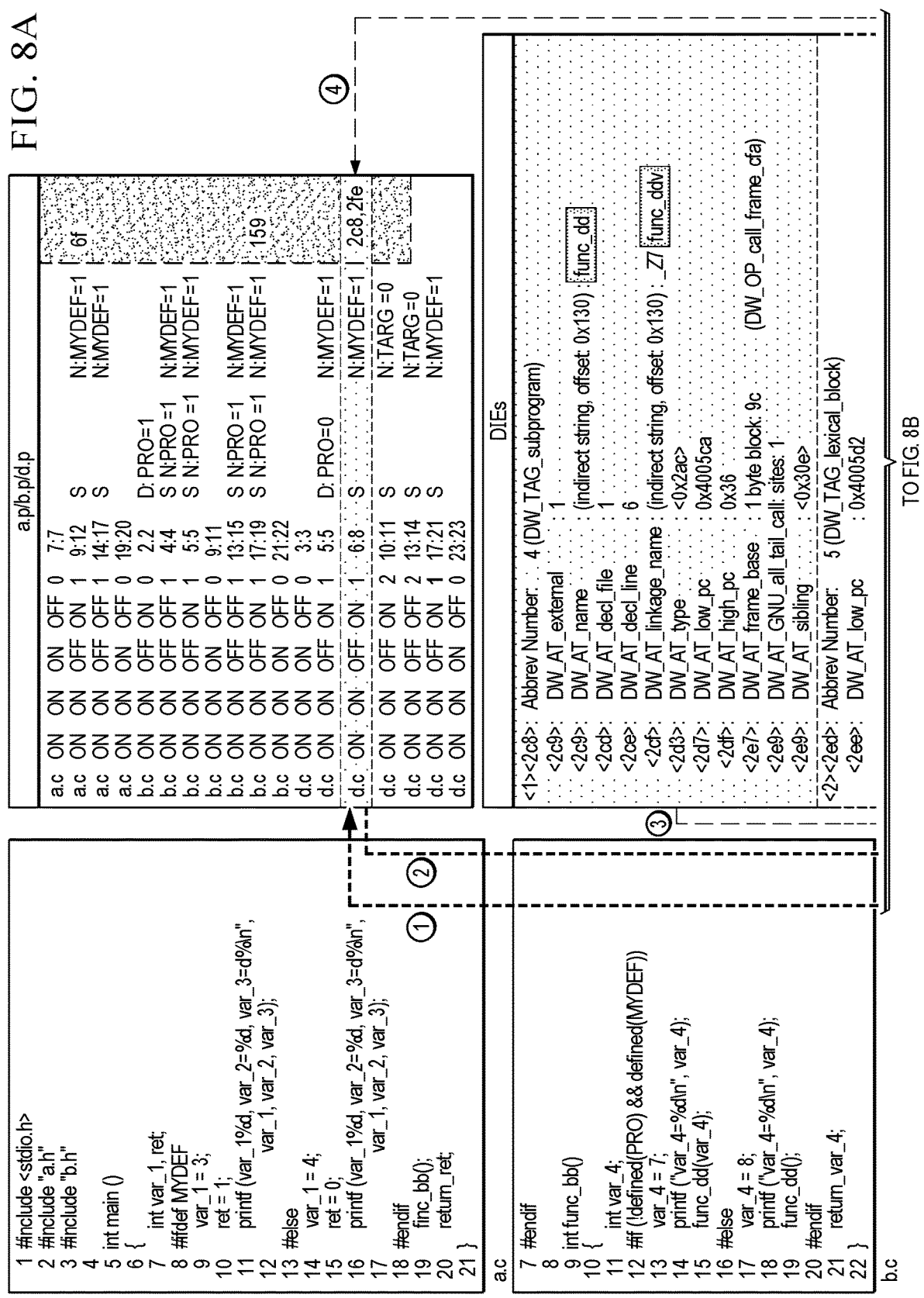
FIG. 8A depicts a data flow diagram for generating an index and table in accordance with an illustrative embodiment.
Figure 8B:
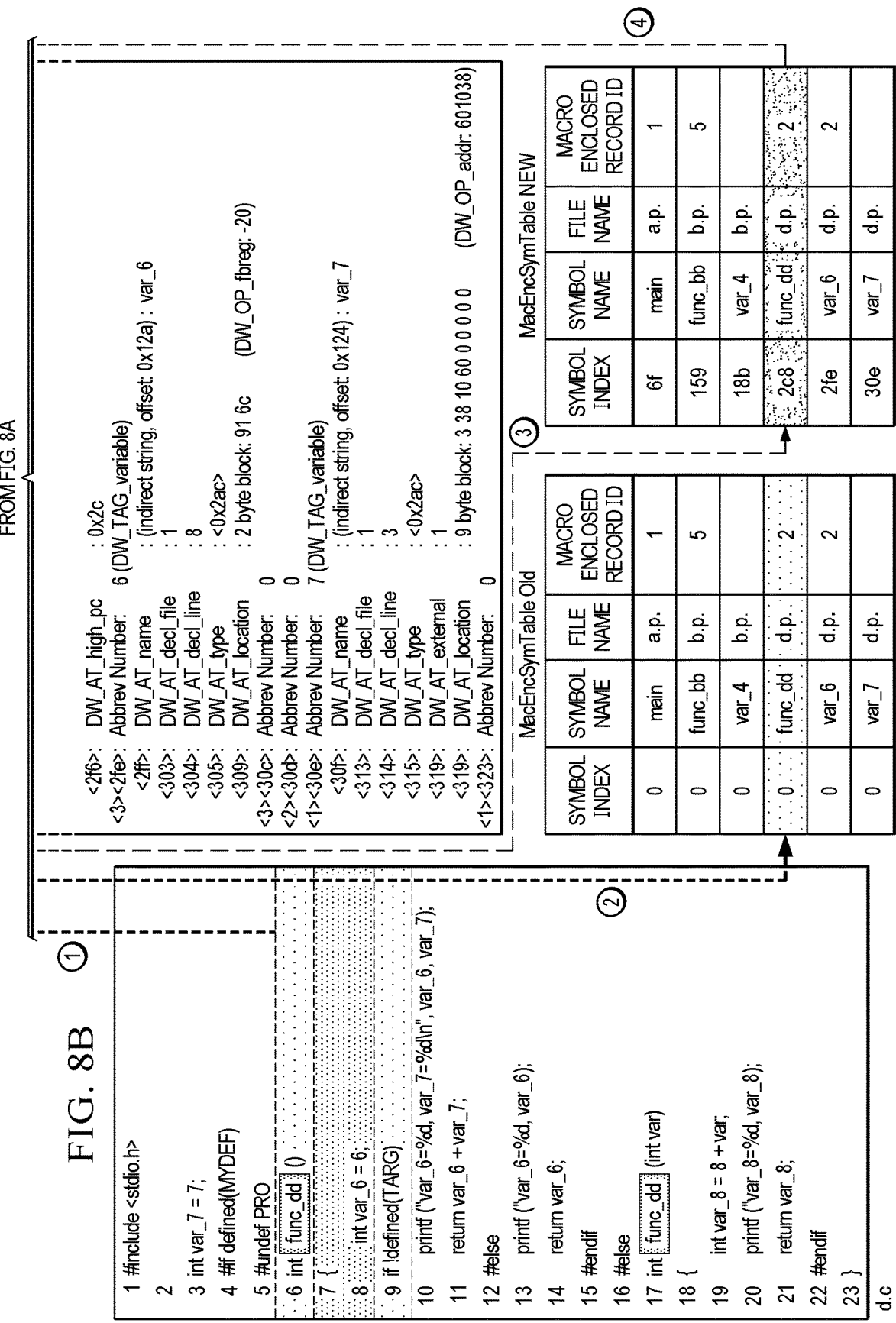
FIG. 8B depicts a data flow diagram for generating an index and table in accordance with an illustrative embodiment.

With reference to FIGS. 8A and 8B, a data flow diagram for generating an index and table is illustrated in accordance with an illustrative embodiment. The data flow illustrated in FIGS. 8A and 8B is an example of how MacroEncSymIdx 416 and tables 450 in FIG. 4 are generated. In this example, computer instructions of source code file d.c at lines 6-8 are being complied. A code segment with the function of func_dd is included in the computer instructions being complied. The compiler compiles the code segments of computer instructions of all codes of source code file d.c into a preprocessed file along with the information records of all code segments including func_dd.

The debugger creates a table with relational information between features and properties of different code segments as shown by MacEncSymTable Old table. In the present example, MacEncSymTable Old table includes a Symbol Name column indicating the function name of a code segment, a File Name column indicating which preprocessed file does the function of the code segment belongs to, a Macro Enclosed Record ID, and a Symbol Index column with blanks.

The compiler also generates debug information DIEs associated with the functions of different code segment with the information records. The debugger searches the debug information DIEs to locate the detail debugging information for each function of the code segments and identify the symbols representing functions of the code segments. In the present example, symbol "2c8" is identified in the DIEs for func_dd of source code file d.c.

Subsequently, the debugger adds the symbol found for each function of the code segments into the MacEncSymTable Old table to generate a new table as shown by MacEncSymTable New. In this example, symbol "2c8" identified from DIEs are inserted in the symbol index column for function of func_dd.

The compiler then updates the information records of code segments by inserting the symbol obtained from the symbol index column of MacEncSymTable New table for each function. In this example, the symbol "2c8" is inserted into the information records in the far right column of the information records for function of func_dd in source code file d.c.

Figure 9A:
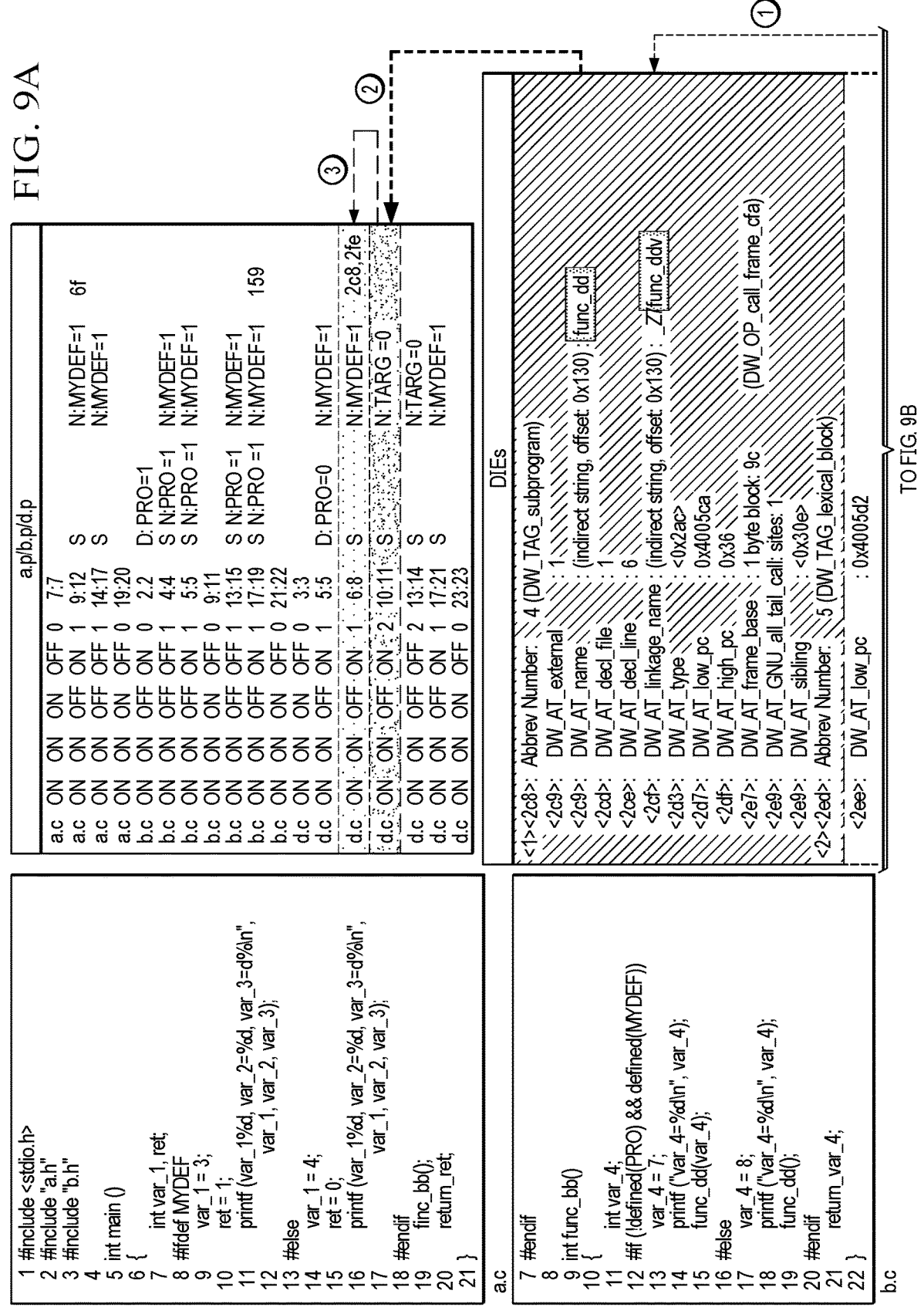
FIG. 9A depicts a data flow diagram of debugger components operations in accordance with an illustrative embodiment.

With reference to FIGS. 9A and 9B, a data flow diagram of debugger components operations is illustrated in accordance with an illustrative embodiment. The data flow illustrated in FIGS. 9A and 9B is an example of how MacroEnclosedStackFrameLocate 444 and MacroEnclosedStackFrameBuild 446 in FIG. 4 operate.

When the debugger hits a breakpoint at code segment of line 10 in source code file "d.c", the debugger needs to display the stack frame when the debugging command includes 'backtrace' or 'where'.

In order to display the stack frame for the code segment being compiled, the debugger first locates the debug information DIEs with the current address of code segment (i.e., code at line 10) by querying the debug information DIE. In this example, the debugger queries the debug information DIE to get a corresponding symbol "2c8" for code at line 10 in source code file d.c.

The debugger then searches the symbol "2c8" in MacEncSymTable New table shown in FIG. 8B to get the corresponding macro enclosed record in the information records of the code segments. A macro enclosed record is an entry in the information records listing the row of information associated with a particular code segment. In this example, the identified macro enclosed record is highlighted in the information records of source code files of a.c, b.c, and d.c.

Next, the debugger locates the corresponding macro enclosed record with symbol '2c8'. The debugger then builds a stack frame for the code at line 10 in the source code file d.c using information obtained from macro enclosed record of the code segment. In this example, the located macro enclosed record of d.p[2] and a stack frame of "#1 ME: #if !defined (TARG) at d.c:9—TARG: 1" is subsequently built by the debugger using a component such as MacroEnclosedStackFrameBuild 446 shown in FIG. 4.

In some examples, if the value of MacroEnclosedLevel (the level depth of the code segment) is greater than 0, the debugger assigns the information record with an internal flag to indicate that the code segment is nested in another piece of code.

The debugger uses a component such as MacroEnclosedStackFrameLocate 444 in FIG. 4 to search the information records backward to locate the macro enclosed record of another code segment that has an immediate lower MacroEnclosedLevel compared to the code segment mentioned above. In this example, the macro enclosed record (6:8) (highlighted) has been identified. The debugger then continues to search backwards in the information records to locate a macro enclosed record until the located code segment has a MacroEnclosedLevel equal to 0. In other words, the debugger keeps searching until the located code segment is not a nested code. In this illustrative example, the macro enclosed record (5:5) is located but its MacroEnclosedLevel is 1, which makes the debugger continue to locate the next record of code segment. Finally, the debugger gets the macro enclosed record (3:3) with a MacroEnclosedLevel of 0 and builds a new stack frame for the code segment at line 3 of source code file d.c using the MacroEnclosedStackFrameBuild 446 shown in FIG. 4.

Figure 10:
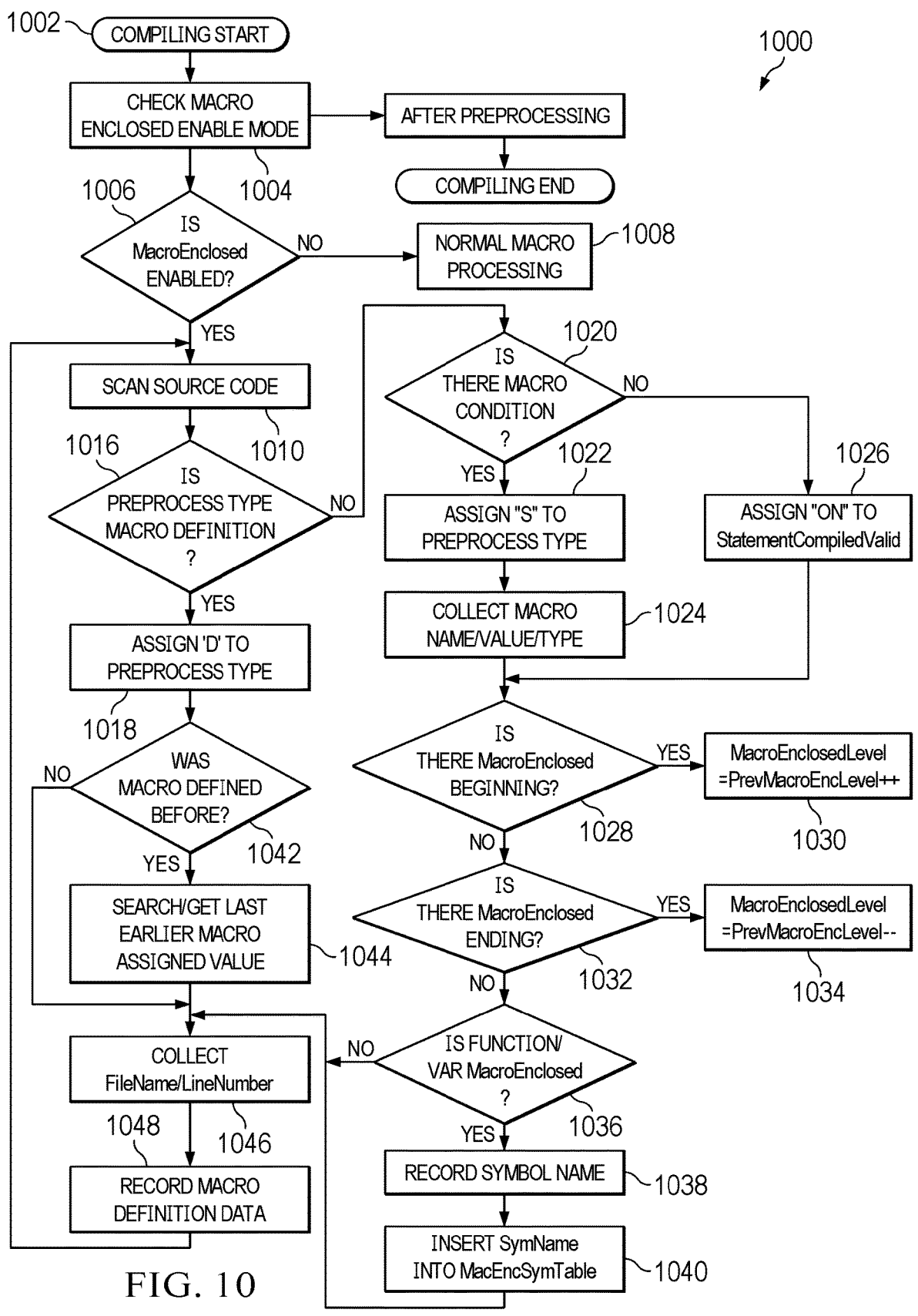
FIG. 10 depicts a flowchart of a process for generating a data structure for information associated with computer instructions enclosed by macros in accordance with an illustrative embodiment.

FIG. 10 depicts a flowchart of a process for generating a data structure for information associated with computer instructions enclosed by macros in accordance with an illustrative embodiment. Process in 1000 can be implemented in hardware, software, or both. When implemented in software, the process can take the form of program instructions that is run by one of more processor units located in one or more hardware devices in one or more computer systems. For example, the process can be implemented in data structure manager 234 in computer system 250 in FIG. 2.

Process 1000 begins by compiling computer instructions enclosed by macros (step 1002) and checking the macro enclosed enable mode of the computer instructions (step 1004). The process determines if the stack frame of the computer instructions is enabled (step 1006). In step 1004 and 1006, the process determines whether the functionality of presenting additional information during a debugging session discussed in the present disclosure is activated. If the stack frame of the computer instructions has been enabled, the process scans the computer instructions of source code (step 1010). If the stack frame of the computer instructions has not been enabled, the process proceeds with compiling procedures according to existing technologies (step 1008).

The scanning process (steps 1010-1046) is repeated for each computer instruction in the computer instructions being complied. The process initiates scanning by checking the "Preprocesstype" field of information records for scanned computer instruction to determine whether the scanned computer instruction is a definition of compile time condition such as macro definition of #define MYDEF (step 1016). If so, the value of "Preprocesstype" field is assigned with a flag 'D' (step 1018). In this illustrative example, the information records can be macro enclosed information 406 in FIG. 4.

In addition, if a computer instruction that is enclosed in the compile time condition is present, the "MacroEnclosed" field of such computer instruction's information records is set to 'ON', otherwise, the "MacroEnclosed" field of such computer instruction's information records is set to 'OFF'. In an illustrative example, parameters of computer instructions' information records such as SpecificMacroType, ReferredMacroName, and CurrentMacroValue can also be recorded at this step.

If the scanned computer instruction is not a definition of compile time condition, process 1000 determines whether the scanned computer instruction is a condition of a compile time condition such as a macro condition (step 1020). If the computer instruction is a condition of a compile time condition, the process assigns flag 'S' to the "Preprocesstype" field of information records of the scanned computer instruction (step 1022). The process then collects macro name, present value, and macro type from the scanned computer instruction (step 1024).

If the scanned computer instruction is not a condition of a compile time condition, the process assigns 'ON' to the "StatementCompliedValid" field of information records of the scanned computer instruction (step 1026) then proceeds to step 1028.

The process checks whether a macro enclosed beginning is present, which is defined by the development tool during syntax parsing (step 1028). In this illustrative example, the macro enclosed beginning is the beginning code line of the scanned computer instruction. If a macro enclosed beginning is present, the process increases the value of the "MacroEnclosedLevel" field in the information records of the scanned computer instruction, for example, from zero to one (step 1030).

The process then checks whether a macro enclosed ending is present, which is also defined by the compiler/linker during syntax parsing (step 1032). In this illustrative example, the macro enclosed ending is the ending code line of scanned computer instruction. If macro enclosed ending is present, the process decreases the value of the "MacroEnclosedLevel" field in the information records of the scanned computer instruction, for example, from one to zero (step 1034).

The process determines whether the functions and variables of the scanned computer instruction are enclosed by a macro (step 1036). If the functions and variables of the scanned computer instruction is not enclosed by a macro the process proceeds to step 1046.

If the functions and variables of the scanned computer instruction are enclosed by a macro, the process records the identifier of the functions and variables of scanned computer instruction into an index (step 1038). In this illustrative example, the identifier of the function and variable of scanned computer instruction can be extracted by searching debug information of the scanned computer instruction, such as debug information 430 in FIG. 4. The process then inserts the identifier on the index into a MacEncSymTable, which is a table maintained by the debugger (step 1040). In this illustrative example, the table can be table 450 in FIG. 4. The process proceeds to step 1046.

Returning to step 1016, if the scanned computer instruction includes a definition of a compile time condition (flag D), the process determines whether the compile time condition such as MYDEF has been previously defined (step 1042). In step 1042, the compile time condition is previously defined when the same compile time condition can be found in other segments of code before the scanned computer instruction. In an illustrative example, process performs the determination by searching the macro name through the existing information in the information records of the scanned computer instruction. If the compile time condition of the scanned computer instruction was not defined before, the process proceeds to step 1046.

If the compile time condition of the scanned computer instruction was defined before, the process searches and obtains the last value assigned to the compile time condition (step 1044). For example, the last value assigned to the compile time condition can be a '1' in the "MYDEF" of FIG. 7, where the value '1' is passed by compiling command option '-DMYDEF'. In this example, the obtained value "1" is recorded into an "EarlierAssignedMacroValue" field in information records of computer instructions.

The process collects the metadata such as file name and line number associated with the scanned computer instruction enclosed by macro (step 1046). The process stores the collected metadata associated with the scanned computer instruction in the information records of scanned computer instruction (step 1048). Process 1000 terminates thereafter.

FIG. 11 depicts a flowchart illustrating a process for debugging computer instructions in accordance with an illustrative embodiment. Process 1100 can be implemented in hardware, software, or both. When implemented in software, the process can take the form of program instructions that is run by one of more processor units located in one or more hardware devices in one or more computer systems. For example, process 1100 can be implemented in debugging system 200 in computer system 250 in FIG. 2.

Process 1100 begins by receiving a computer program, including a source code (step 1102). The system generates a number of information records associated with one or more computer instructions in the source code, wherein at least one of the computer instructions comprises a function enclosed by a macro (step 1104). The computer instructions may comprise definitions of compile time conditions. The computer instructions may also comprise conditions of compile time conditions.

The system then creates a data structure based on the information records (step 1106). The data structure may be, e.g., a table. The system generates an index of identifiers in the data structure based on debug information of the computer instructions, wherein the index comprises respective identifying entries for the computer instructions (step 1108). The debug information of the computer instructions describes contents and usage of program source files.

The system updates the information records according to the identifying entries in the data structure (step 1110). Process 1100 then ends.

FIG. 12 depicts a flowchart illustrating a process for creating a stack frame of information records for computer instructions in accordance with an illustrative embodiment. Process 1200 comprises additional steps that can be performed by the debugging system after generation of the object code in step 1112 in process 1100.

Process 1200 begins by querying the debug information to locate the identifying entry for one of the computer instructions (step 1202). The system identifies the information record of the computer instruction according to the data structure and the identifying entry for the computer instruction (step 1204) and creates a stack frame for the computer instruction based on the identified information record of the computer instruction (step 1206).

The system may display the new stack frame in a graphical user interface during debugging session (step 1208). Process 1200 then ends.

FIG. 13 depicts a flowchart illustrating a process for identifying nested computer instructions in accordance with an illustrative embodiment. Process FIG. 1300 may be performed as part of step 1204 in FIG. 12.

Process 1300 begins by determining whether the computer instruction is nested within another computer instruction (step 1302). Responsive to a determination that the computer instruction is nested, the system recursively searches the information records backwards to locate macro enclosed records for other computer instructions at progressive lower code level depths (step 1304) and stops the recursive search upon arrival at an unnested computer instruction. Process 1300 then ends.

Figure 14:
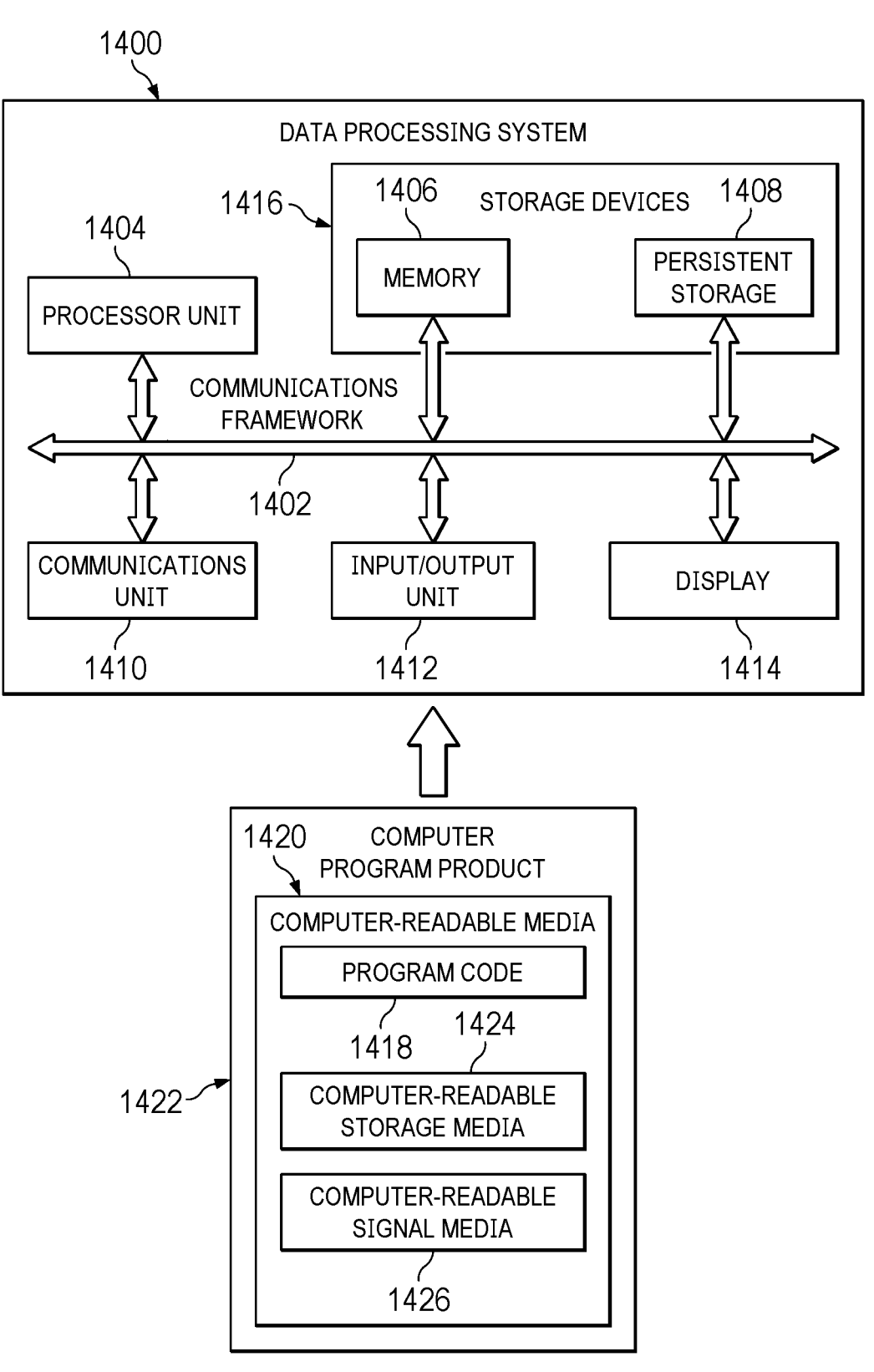
FIG. 14 depicts a block diagram of a data processing system in accordance with an illustrative embodiment.

Turning now to FIG. 14, a block diagram of a data processing system is depicted in accordance with an illustrative embodiment. Data processing system 1400 can be used to implement server computer 104, server computer 106, client devices 110, in FIG. 1. Further, data processing system 1400 can also be used to implement one more components in computer system 250 in FIG. 2. In this illustrative example, data processing system 1400 includes communications framework 1402, which provides communications between processor unit 1404, memory 1406, persistent storage 1408, communications unit 1410, input/output (I/O) unit 1412 and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

Persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program code, computer usable program code, or computer-readable program code that can be read and executed by a processor in processor unit 1404. The program code in the different embodiments can be embodied on different physical or computer-readable storage media, such as memory 1406 or persistent storage 1408.

Program code 1418 is located in a functional form on computer-readable media 1420 that is selectively removable and can be loaded onto or transferred to data processing system 1400 for execution by processor unit 1404. Program code 1418 and computer-readable media 1420 form computer program product 1422 in these illustrative examples. In the illustrative example, computer-readable media 1420 is computer-readable storage media 1424.

In these illustrative examples, computer-readable storage media 1424 is a physical or tangible storage device used to store program code 1418 rather than a medium that propagates or transmits program code 818.

Alternatively, program code 1418 can be transferred to data processing system 1400 using a computer-readable signal media 1426. The computer-readable signal media 1426 can be, for example, a propagated data signal containing program code 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1420" can be singular or plural. For example, program code 1418 can be located in computer-readable media 1420 in the form of a single storage device or system. In another example, program code 1418 can be located in computer-readable media 1420 that is distributed in multiple data processing systems. In other words, some instructions in program code 1418 can be located in one data processing system while other instructions in program code 1418 can be located in a separate data processing system. For example, a portion of program code 1418 can be located in computer-readable media 1420 in a server computer while another portion of program code 1418 can be located in computer-readable media 1420 located in a set of client computers.

The different components illustrated for data processing system 1400 are not meant to provide architectural limitations to the manner in which different embodiments can be implemented. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for debugging computer instructions, the method comprising:

using a compiler to receive a computer program, wherein the computer program comprises a source code for execution on a target computing platform, and wherein the source code is developed for a different computing platform;

generating a number of information records associated with a number of computer instructions in the source code, wherein at least one of the computer instructions comprises a function enclosed by a macro;

creating a data structure based on the information records;

generating an index of identifiers in the data structure based on debug information of the computer instructions, wherein the index comprises respective identifying entries for the computer instructions;

updating the information records according to the identifying entries in the data structure using the compiler;

debugging the source code of the computer program using the updated information records in a debugging session; and compiling the computer program using the compiler for execution on the target computing platform.

2. The method of claim 1, further comprising:

querying the debug information to locate the identifying entry for one of the computer instructions;

identifying the information record of the computer instruction according to the data structure and the identifying entry for the computer instruction; and creating a stack frame for the computer instruction based on the identified information record of the computer instruction.

3. The method of claim 2, further comprising:

determining whether the computer instruction is nested within another computer instruction;

responsive to a determination that the computer instruction is nested, recursively searching the information records backwards to locate macro enclosed records for other computer instructions at progressive lower code level depths; and stopping the recursive search upon arrival at an unnested computer instruction.

4. The method of claim 2, further comprising displaying the stack frame in a user interface during debugging session.

5. The method of claim 1, wherein the debug information of the computer instructions describes contents and usage of program source files.

6. The method of claim 1, wherein the computer instructions comprise definitions of compile time conditions.

7. The method of claim 1, wherein the computer instructions comprise conditions of compile time conditions.

8. A computer system for debugging computer instructions, the computer system comprising:

a storage device that stores program instructions; and a number of processors in communication with the storage device, wherein the processors execute the program instructions to:

use a compiler to receive a computer program, wherein the computer program comprises a source code for execution on a target computing platform, and wherein the source code is developed for a different computing platform;

generate a number of information records associated with a number of computer instructions in the source code, wherein at least one of the computer instructions comprises a function enclosed by a macro associated with a conditional expansion dependent on one or more configurations of the compiler;

create a data structure based on the information records;

generate an index of identifiers in the data structure based on debug information of the computer instructions, wherein the index comprises respective identifying entries for the computer instructions;

update the information records according to the identifying entries in the data structure using the compiler;

debug the source code of the computer program using the updated information records in a debugging session; and compile the computer program using the compiler for execution on the target computing platform.

9. The computer system of claim 8, wherein the processors further execute program instructions to:

query the debug information to locate the identifying entry for one of the computer instructions;

identify the information record of the computer instruction according to the data structure and the identifying entry for the computer instruction; and create a stack frame for the computer instruction based on the identified information record of the computer instruction.

10. The computer system of claim 9, wherein the processors further execute program instructions to:

determine whether the computer instruction is nested within another computer instruction;

responsive to a determination that the computer instruction is nested, recursively search the information records backwards to locate macro enclosed records for other computer instructions at progressive lower code level depths; and stopping the recursive search upon arrival at an unnested computer instruction.

11. The computer system of claim 9, wherein the processors further execute program instructions to display the stack frame in a user interface during debugging session.

12. The computer system of claim 8, wherein the debug information of the computer instructions describes contents and usage of program source files.

13. The computer system of claim 8, wherein the computer instructions comprise definitions of compile time conditions.

14. The computer system of claim 8, wherein the computer instructions comprise conditions of compile time conditions.

15. A computer program product for debugging computer instructions, the computer program product comprising:

a computer-readable storage medium having program instructions embodied thereon to perform the steps of:

use a compiler to receive a computer program using a compiler, wherein the computer program comprises a source code for execution on a target computing platform, and wherein the source code is developed for a different computing platform;

generating a number of information records associated with a number of computer instructions in the source code, wherein at least one of the computer instructions comprises a function enclosed by a macro associated with a conditional expansion dependent on one or more configurations of the compiler;

creating a data structure based on the information records;

generating an index of identifiers in the data structure based on debug information of the computer instructions, wherein the index comprises respective identifying entries for the computer instructions;

updating the information records according to the identifying entries in the data structure using the compiler;

debugging the source code of the computer program using the updated information records in a debugging session; and compiling the computer program using the compiler for execution on the target computing platform.

16. The computer program product of claim 15 further comprising instructions for:

querying the debug information to locate the identifying entry for one of the computer instructions;

identifying the information record of the computer instruction according to the data structure and the identifying entry for the computer instruction; and creating a stack frame for the computer instruction based on the identified information record of the computer instruction.

17. The computer program product of claim 16 further comprising instructions for:

determining whether the computer instruction is nested within another computer instruction;

responsive to a determination that the computer instruction is nested, recursively searching the information records backwards to locate macro enclosed records for other computer instructions at progressive lower code level depths; and stopping the recursive search upon arrival at an unnested computer instruction.

18. The computer program product of claim 16, further comprising instructions for displaying the stack frame in a user interface during debugging session.

19. The computer program product of claim 15, wherein the computer instructions comprise definitions of compile time conditions.

20. The computer program product of claim 15, wherein the computer instructions comprise conditions of compile time conditions.

* * * * *